US009712757B2

(12) United States Patent
Nashizawa

(10) Patent No.: US 9,712,757 B2
(45) Date of Patent: Jul. 18, 2017

(54) IMAGE CAPTURING APPARATUS CAPABLE OF COMPOSITING IMAGES GENERATED USING THE SAME DEVELOPMENT PARAMETER AND CONTROL METHOD THEREFOR

(71) Applicant: CANON KABUSHIKI KAISHA, Tokyo (JP)

(72) Inventor: Hiroaki Nashizawa, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 31 days.

(21) Appl. No.: 14/809,462

(22) Filed: Jul. 27, 2015

(65) Prior Publication Data

US 2016/0037046 A1    Feb. 4, 2016

(30) Foreign Application Priority Data

Jul. 31, 2014    (JP) ................... 2014-157046

(51) Int. Cl.
| H04N 5/235 | (2006.01) |
| H04N 5/355 | (2011.01) |
| G06T 5/50 | (2006.01) |
| H04N 9/64 | (2006.01) |
| H04N 1/387 | (2006.01) |

(52) U.S. Cl.
CPC ....... H04N 5/2355 (2013.01); H04N 5/35536 (2013.01); G06T 5/50 (2013.01); G06T 2207/10024 (2013.01); G06T 2207/10144 (2013.01); G06T 2207/20208 (2013.01); H04N 1/3871 (2013.01); H04N 5/2353 (2013.01); H04N 5/35581 (2013.01); H04N 9/64 (2013.01)

(58) Field of Classification Search
None
See application file for complete search history.

(56) References Cited

U.S. PATENT DOCUMENTS

| 2008/0180749 A1* | 7/2008 | Pollard ................ G06T 5/50 358/3.24 |
| 2009/0180022 A1* | 7/2009 | Kwon ............... H04N 5/2353 348/362 |

(Continued)

FOREIGN PATENT DOCUMENTS

| JP | 2009-278524 A | 11/2009 |
| JP | 2012-049600 A | 3/2012 |

*Primary Examiner* — Justin P Misleh
(74) *Attorney, Agent, or Firm* — Cowan, Liebowitz & Latman, P.C.

(57) ABSTRACT

An image capturing apparatus that includes an image capturing unit; an image capture control unit configured to control the image capturing unit to repeat image capture of frame images under different exposures; a development unit configured to apply development processing to each of the captured frame images; and a composition unit configured to generate a composite image by compositing temporally consecutive images that have been developed by the development unit, wherein the development unit generates, from one of the captured frame images, a first image and a second image that are associated with different development parameters, and the composition unit composites images generated using the same development parameter among images generated from the captured frame images that are temporally consecutive.

11 Claims, 21 Drawing Sheets

(56) References Cited

U.S. PATENT DOCUMENTS

| | | | |
|---|---|---|---|
| 2013/0044237 A1* | 2/2013 | Ikizyan | H04N 5/2355 |
| | | | 348/229.1 |
| 2014/0153895 A1* | 6/2014 | Endo | H04N 5/772 |
| | | | 386/224 |
| 2014/0313369 A1* | 10/2014 | Kageyama | G06T 11/001 |
| | | | 348/223.1 |

* cited by examiner

FIG. 3

| 11 | 12 | 13 | 14 | 15 | 16 | 17 | 18 | 19 | Y1 |
| 21 | 22 | 23 | 24 | 25 | 26 | 27 | 28 | 29 | Y2 |
| 31 | 32 | 33 | 34 | 35 | 36 | 37 | 38 | 39 | Y3 |
| 41 | 42 | 43 | 44 | 45 | 46 | 47 | 48 | 49 | Y4 |
| 51 | 52 | 53 | 54 | 55 | 56 | 57 | 58 | 59 | Y5 |
| 61 | 62 | 63 | 64 | 65 | 66 | 67 | 68 | 69 | Y6 |
| 71 | 72 | 73 | 74 | 75 | 76 | 77 | 78 | 79 | Y7 |
| X1 | X2 | X3 | X4 | X5 | X6 | X7 | X8 | X9 | |

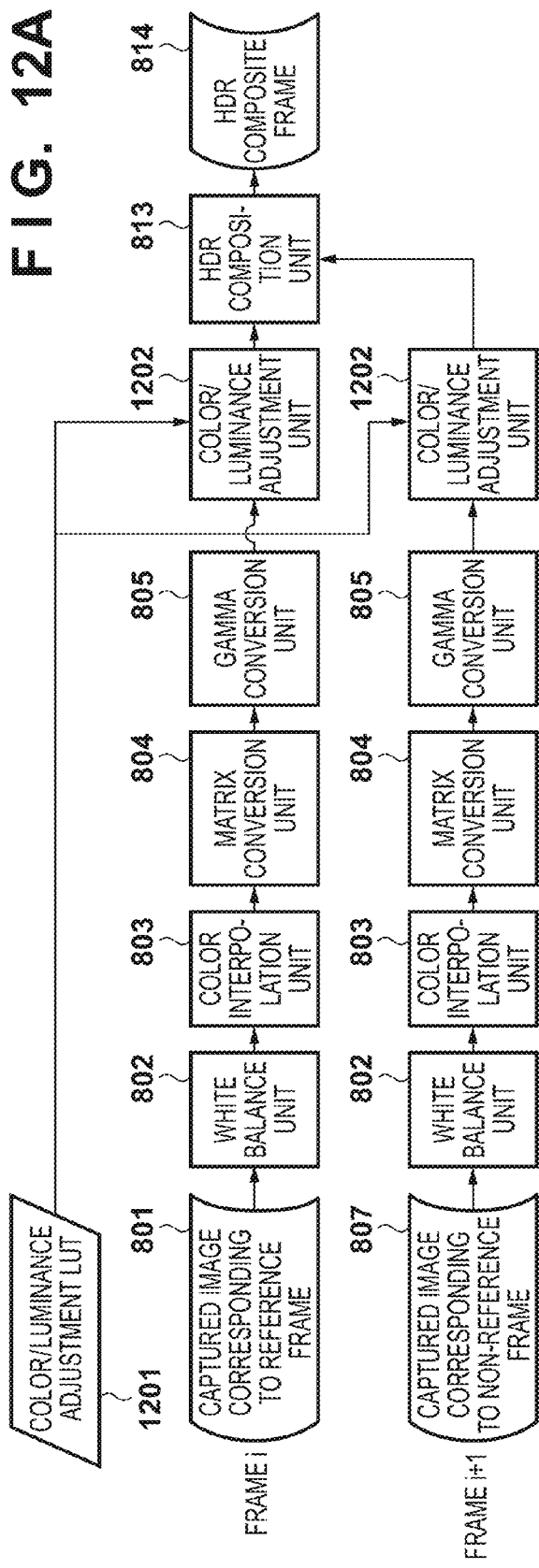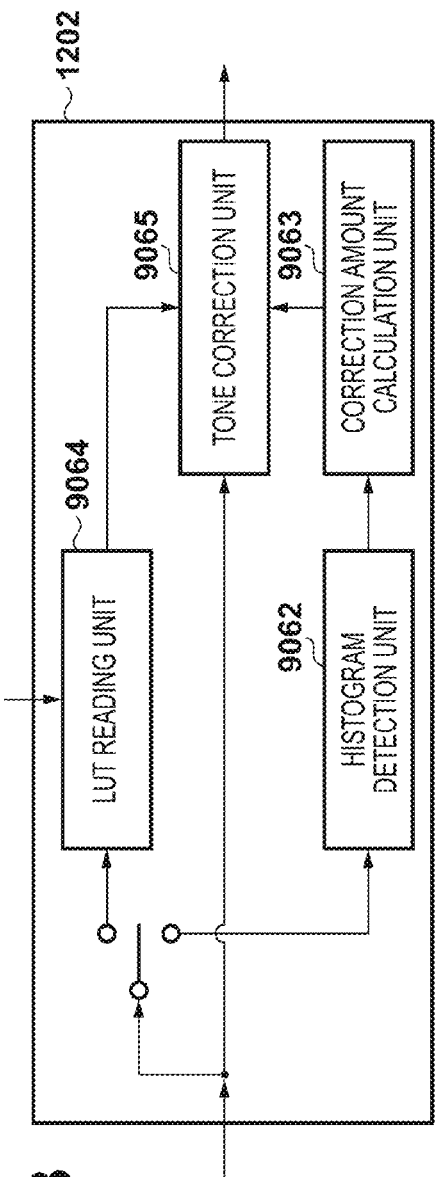

CORRECTION TABLE

LOOKUP TABLE

IMAGE CAPTURING APPARATUS CAPABLE OF COMPOSITING IMAGES GENERATED USING THE SAME DEVELOPMENT PARAMETER AND CONTROL METHOD THEREFOR

BACKGROUND OF THE INVENTION

Field of the Invention

The present invention relates to an image capturing apparatus and a control method therefor, and in particular to a technique to generate a high-dynamic-range image.

Description of the Related Art

A technique called high-dynamic-range (HDR) composition is known in which a dynamic range of an image is increased by compositing a plurality of images captured under different exposures (underexposure and overexposure). With this technique, correctly-exposed portions of various images are composited so as to suppress blown-out highlights and blocked-up shadows and obtain an image presenting preferred tones from a dark region to a bright region.

The HDR composition technique is applicable not only in capturing still images, but also in capturing video. There are configurations for performing HDR composition in capturing video (HDR video capture), one known example being a configuration in which video is captured while applying different exposures (underexposure and overexposure) to frames of the video in an alternating manner.

Japanese Patent Laid-Open No. 2012-049600 discloses a technique to apply white balance control to video frames, and perform HDR composition using images to which the white balance control has been applied. On the other hand, Japanese Patent Laid-Open No. 2009-278524 discloses a technique to perform image capture consecutively while changing the exposure, and perform HDR composition using a plurality of temporally neighboring images. In processing related to HDR composition, processes for temporally neighboring images overlap; in this way, the processing result of an image that is processed first is reused in the next HDR composition, and hence the processing is executed efficiently.

With the technique disclosed in Japanese Patent Laid-Open No. 2012-049600, HDR composition processing is delayed until processing necessary for the white balance control, such as extraction of color information, estimation of light source information, and setting of a white balance gain, is completed for all frames. Therefore, in a case where HDR composition is performed using images of two frames with different exposures, a frame rate is reduced by half. On the other hand, with the technique disclosed in Japanese Patent Laid-Open No. 2009-278524, a frame rate can be practically maintained due to reuse of the process for one of temporally neighboring images. However, as the image processing result of one image is reused in HDR composition, in a scene where colors and luminances change with time, deterioration in the image quality associated with colors and luminances is expected to occur in the form of, for example, a tone jump due to the failure to apply appropriate image processing.

SUMMARY OF THE INVENTION

The present invention has been made in consideration of the aforementioned problems, and realizes a technique to reduce deterioration in the image quality of a generated image, even in a scene where colors and luminances change during HDR video capture.

In order to solve the aforementioned problems, the present invention provides an image capturing apparatus comprising: an image capturing unit; an image capture control unit configured to control the image capturing unit to repeat image capture of frame images under different exposures; a development unit configured to apply development processing to each of the captured frame images; and a composition unit configured to generate a composite image by compositing temporally consecutive images that have been developed by the development unit, wherein the development unit generates, from one of the captured frame images, a first image and a second image that are associated with different development parameters, and the composition unit composites images generated using the same development parameter among images generated from the captured frame images that are temporally consecutive.

In order to solve the aforementioned problems, the present invention provides a control method of an image capturing apparatus, the control method comprising: an image capturing step in which an image capturing unit performs image capture; an image capture control step of controlling the image capturing unit to repeat image capture of frame images under different exposures; a development step of applying development processing to each of the captured frame images; and a composition step of generating a composite image by compositing temporally consecutive images that have been developed in the development step, wherein the development step generates, from one of the captured frame images, a first image and a second image that are associated with different development parameters, and the composition step composites images generated using the same development parameter among images generated from the captured frame images that are temporally consecutive.

In order to solve the aforementioned problems, the present invention provides a non-transitory computer-readable storage medium storing a program for causing a computer to function as each unit of the image capturing apparatus comprising: an image capturing unit; an image capture control unit configured to control the image capturing unit to repeat image capture of frame images under different exposures; a development unit configured to apply development processing to each of the captured frame images; and a composition unit configured to generate a composite image by compositing temporally consecutive images that have been developed by the development unit, wherein the development unit generates, from one of the captured frame images, a first image and a second image that are associated with different development parameters, and the composition unit composites images generated using the same development parameter among images generated from the captured frame images that are temporally consecutive.

According to the present invention, deterioration in the image quality of a generated image can be reduced, even in a scene where colors and luminances change during HDR video capture.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 3 shows an obtained signal for photometric measurements and division of a region according to the first embodiment.

FIGS. 12A and 12B are block diagrams showing example functional configurations for development processing and composition processing according to the second embodiment.

DESCRIPTION OF THE EMBODIMENTS (First Embodiment)

The following describes an exemplary embodiment of the present invention in detail with reference to the drawings. It should be noted that the following description pertains to an example in which the present invention is applied to a digital camera having an image capturing function with which video can be obtained while changing the exposure, the digital camera serving as an example of an image capturing apparatus. However, an image capturing apparatus mentioned in the present invention is not limited to being a digital camera, and may be any electronic device having such an image capturing function. Examples of such an electronic device may include, for example, a mobile telephone device, game console, a tablet terminal, a personal computer, and a wristwatch-or eyeglass-shaped information terminal.

(1. Configuration of Digital Camera)

Figure 1A:
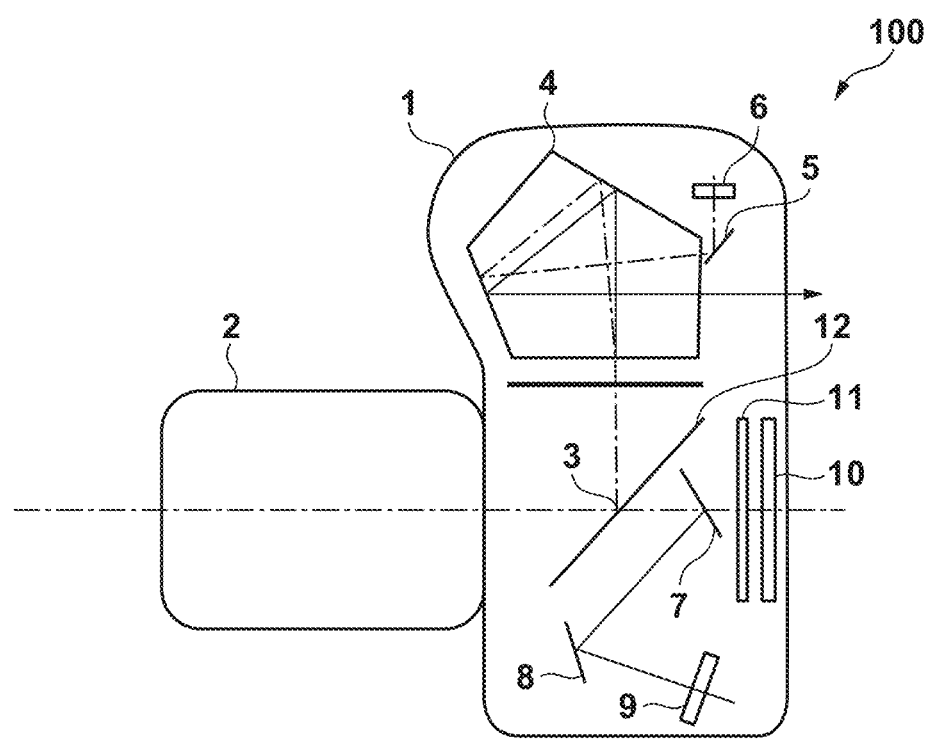
FIG. 1A is a cross-sectional diagram of a digital camera 100 serving as an example of an image capturing apparatus according to an embodiment of the present invention.

FIG. 1A is a cross-sectional diagram showing the arrangement of mainly optical members, sensors, and the like of a digital camera 100 serving as an example of an image capturing apparatus according to an embodiment. The digital camera 100 is a so-called digital single-lens reflex camera that uses interchangeable lenses, and includes a camera body 1 and a changeable lens 2.

An image sensor 10 of the camera body 1 is, for example, a CMOS image sensor or a CCD image sensor, and a plurality of pixels (storage-type photoelectric conversion elements) are arrayed therein. In addition to the pixels arranged in a light receiving portion, for example, an amplifier circuit for pixel signals and a peripheral circuit for signal processing are also formed therein. By adjusting a time period of accumulation of charges and reading of charges for the pixels, the image sensor 10 realizes an electronic shutter function that enables exposure control by an image sensor. In each pixel, photoelectric conversion is applied to an optical image of a subject formed by an image capture optical system included in the changeable lens 2; as a result, an image signal is output on a pixel-by-pixel basis.

A mechanical shutter 11 is provided in the vicinity of the front of the image sensor 10, and adjusts an exposure timing and an exposure time period of the image sensor 10. A semi-transmissive main mirror 3 and a first reflective mirror 7 arranged on the back side of the main mirror 3 are flipped up at the time of image capture. A second reflective mirror 8 further reflects a beam of light reflected by the first reflective mirror 7, thereby making the beam of light incident on an AF sensor 9. The AF sensor 9 may be, for example, an image sensor that has a smaller number of pixels than the image sensor 10. The first reflective mirror 7, the second reflective mirror 8, and the AF sensor 9 are constituents for performing focus detection using a phase difference detection method at an arbitrary position within an image capture screen. It should be noted that, at the time of live-view display and video recording, the main mirror 3 is always in a flipped-up state, and hence exposure control and focus adjustment control are performed using image information of an imaging surface.

An AE sensor 6 is a photometric sensor, and performs photometric measurements by receiving a beam of light from the subject reflected by a pentaprism 4 and a third reflective mirror 5. The AE sensor 6 can divide a light receiving portion into a plurality of regions and output luminance information of the subject on a region-by-region basis.

The pentaprism 4 constitutes a viewfinder optical system. The optical image of the subject reflected by the pentaprism 4 can be observed through a non-illustrated eyepiece. Furthermore, among the beam of light reflected by the pentaprism 4, a part of light rays that are reflected by the main mirror 3 and diffused by a focusing screen 12 deflects from an optical axis and is incident on the AE sensor 6.

The changeable lens 2 is a removable lens, and communicates with the camera body 1 as necessary via a contact point of a lens mount installed in the camera body 1.

Figure 1B:
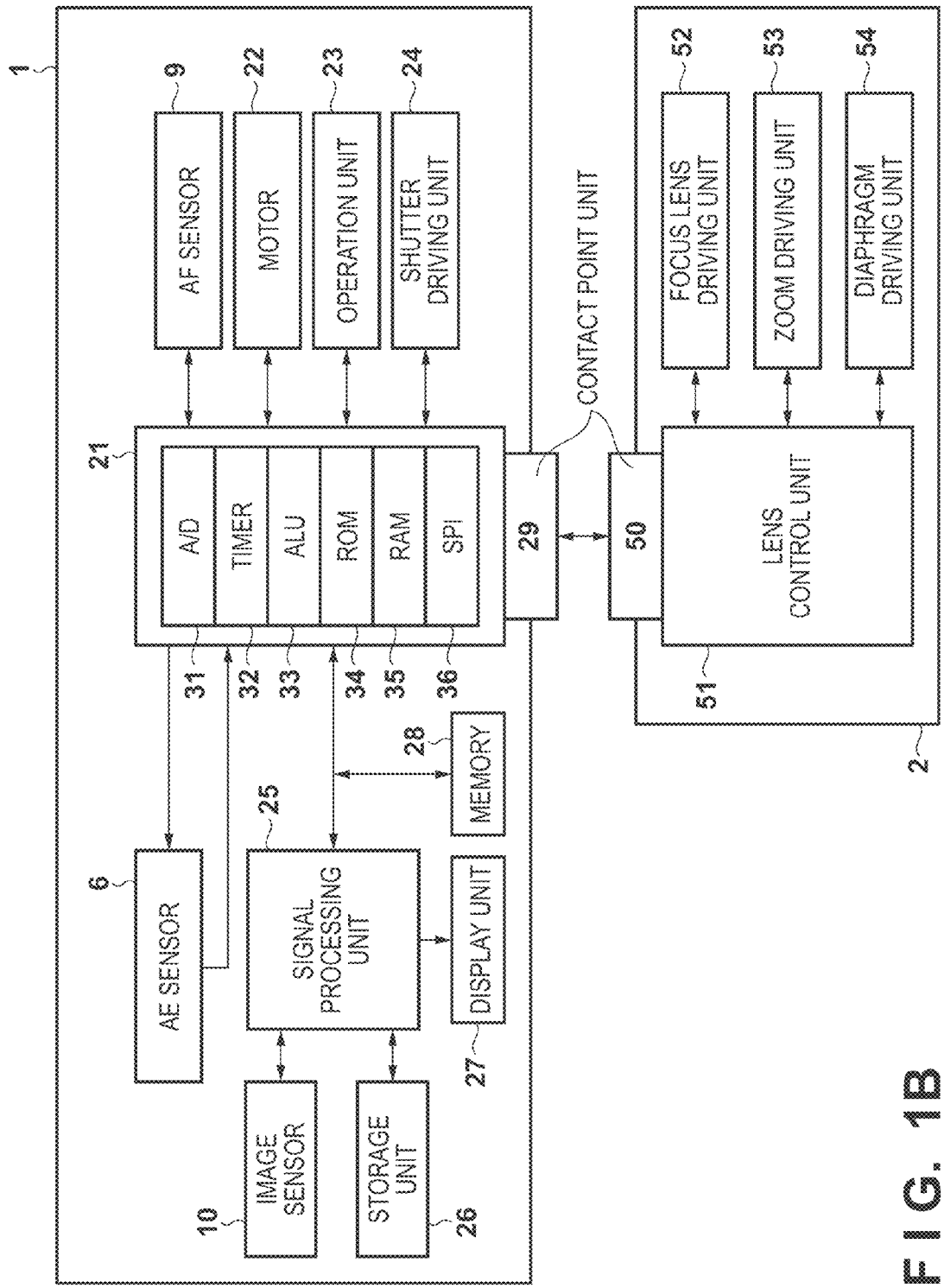
FIG. 1B is a block diagram showing an example functional configuration of the digital camera 100 serving as an example of an image capturing apparatus according to an embodiment of the present invention.

FIG. 1B is a block diagram showing examples of functional configurations of the camera body 1 and the corresponding changeable lens 2 of the digital camera 100 shown in FIG. 1A. It should be noted that one or more of function blocks shown in FIG. 1B may be realized by hardware such as an ASIC and a programmable logic array (PLA), or may be realized by a programmable processor, such as a CPU or an MPU, executing software. Furthermore, one of more of the function blocks may be realized by a combination of software and hardware. Therefore, although different function blocks may serve as main executors of operations in the following description, they can be realized by the same hardware serving as a main executor.

A control unit 21 is, for example, a single-chip microcomputer provided with built-in constituent such as an arithmetic and logic unit (ALU) 33, a ROM 34, a RAM 35, an A/D converter 31, a timer 32, and a serial communication port (SPI) 36. The control unit 21 controls operations of the camera body 1 and the changeable lens 2 by, for example, executing programs stored in the ROM 34. For example, the control unit 21 controls constituents of the camera body 1 so as to execute later-described processing related to HDR video capture. Output signals from the AF sensor 9 and the AE sensor 6 are input to the A/D converter 31 of the control unit 21.

A signal processing unit 25 controls the image sensor 10 in accordance with an instruction from the control unit 21, and obtains image signals by applying A/D conversion and signal processing to signals output from the image sensor 10. In order to record the obtained image signals, the signal processing unit 25 compresses the image signals in a preset format and outputs the compressed image signals to a storage unit 26. It also executes later-described development processing and composition processing that are necessary for HDR video capture.

A memory 28 is a storage apparatus composed of a DRAM and the like. The memory 28 is used as a working memory when the signal processing unit 25 executes various types of signal processing, and is also used as a VRAM when images are displayed on a later-described display unit 27.

The display unit 27 is composed of a liquid crystal display panel and the like, and displays captured images and information such as camera setting values, messages, and a menu screen. The display unit 27 is controlled in response to an instruction from the control unit 21. The storage unit 26 is, for example, a non-volatile memory such as a flash memory, and receives captured image signals from the signal processing unit 25 as input.

Under control by the control unit 21, a motor 22 flips up and down the main mirror 3 and the first reflective mirror 7, and charges the mechanical shutter 11.

An operation unit 23 is an input device group including, for example, switches that are used by a user for camera operations. The operation unit 23 includes, for example, a release switch for issuing instructions for starting an image capture preparatory operation and starting image capture, an image capture mode selection switch for selecting an image capture mode, a direction key, and an enter key.

A contact point unit 29 is a contact point for communicating with the changeable lens 2, and is connected to an input/output signal of the serial communication port of the control unit 21. A shutter driving unit 24 is connected to an output terminal of the control unit 21 and drives the mechanical shutter 11.

The changeable lens 2 includes a contact point unit 50 that is paired with the contact point unit 29. The contact point unit 50 is connected to a lens control unit 51 that is a single-chip microcomputer similar to the control unit 21, and can communicate with the control unit 21. The lens control unit 51 controls operations of the changeable lens 2 based on instructions from the control unit 21 by, for example, executing programs stored in a ROM. It also notifies the control unit 21 of information indicating, for example, the state of the changeable lens 2.

A focus lens driving unit 52 drives a focus lens based on an instruction from the lens control unit 51, and a zoom driving unit 53 changes the angle of view of the changeable lens based on an instruction from the lens control unit 51.

A diaphragm driving unit 54 adjusts the amount of light incident on the image sensor 10 by adjusting the opening of a diaphragm based on an instruction from the lens control unit 51.

Once the changeable lens 2 has been attached to the camera body 1, data communication between the lens control unit 51 and the control unit 21 is enabled via the contact point units 29 and 50. The lens control unit 51 outputs, for example, lens-specific optical information that is necessary for the control unit 21 to perform focus detection and exposure calculation, and information related to a subject distance based on a distance encoder, to the control unit 21 through data communication. Also, once the control unit 21 has transmitted control information related to the focus and diaphragm obtained through focus detection and exposure calculation to the lens, the lens control unit 51 controls the diaphragm and the like in accordance with the received control information. Furthermore, the contact point unit 29 supplies electric power to a non-illustrated motor and actuator provided in the changeable lens 2 via the lens-side contact point unit 50.

(2. Sequence of Operations Related to HDR Video Capture)

Figure 2:
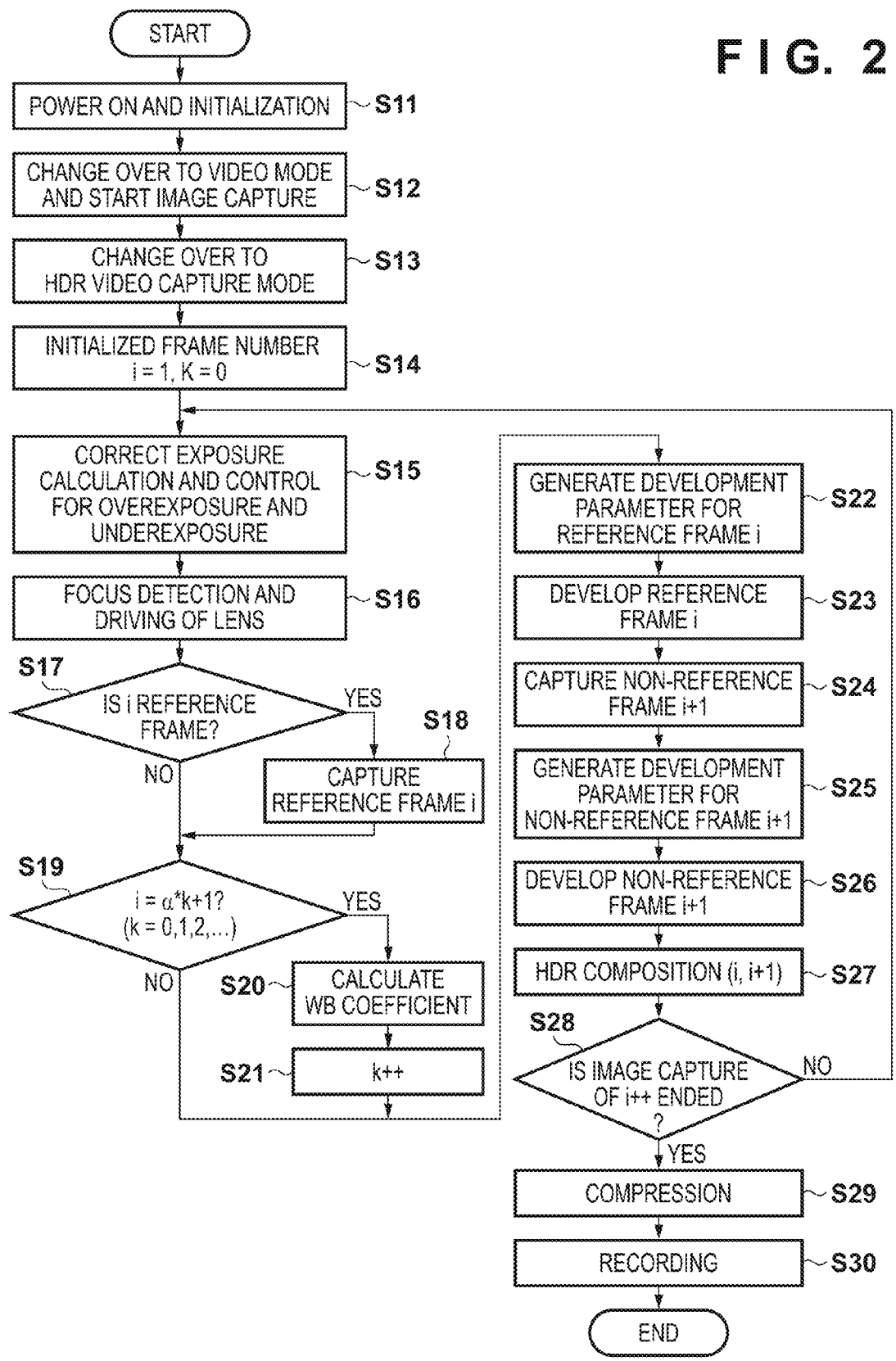
FIG. 2 is a flowchart showing a sequence of operations of HDR video capture processing according to a first embodiment.

A description is now given of a sequence of operations related to HDR video capture with reference to FIG. 2. It should be noted that the present processing is realized by the control unit 21 deploying a program stored in the ROM 34 to a working area of the RAM 35 and executing the deployed program.

In step S11, once operations are enabled by, for example, turning on a power switch included in the operation unit 23, the control unit 21 executes initialization processing, e.g., obtains information of various types of lenses necessary for focus detection and photometric measurements, through communication with the lens control unit 51 of the changeable lens 2.

In step S12, upon detection of an on state of a video mode changeover switch included in the operation unit 23, the control unit 21 changes over to a video mode in relation to, for example, processing for the arrangement of the memory 28, and starts the image capture.

In step S13, upon detection of changeover to HDR video capture through a switch included in the operation unit 23, the control unit 21 changes an image capture mode to an HDR video capture mode. In step S14, the control unit 21 executes initialization processing. The specific substance of the initialization processing will be described later with reference to processing of steps S17 to S21.

In step S15, the control unit 21 sets correct exposure conditions. In the HDR video capture mode, image capture control is performed such that image capture is repeated while alternating between preset exposure settings, e.g., an overexposure setting of +1 EV and an underexposure setting of −1 EV relative to correct exposure. In the present embodiment, the correct exposure is calculated so as to set various exposures. Even after control has been performed to realize the calculated correct exposure, correct exposure calculation is periodically performed during image capture so as to comply with, for example, a change in a scene. Thereafter, exposure control for image capture with an overexposure setting (overexposed image capture), and exposure control for image capture with an underexposure setting (underexposed image capture), are performed.

Below is a more detailed description of processing for calculating the correct exposure in the present step. In the video mode started in step S12, the control unit 21 performs video capture in which so-called live-view images (or through-the-lens images) are captured with the display unit 27 functioning as an electronic viewfinder. This image capture is performed by consecutively performing image capture through a so-called electronic shutter. In this state, the AE sensor 6 cannot perform photometric measurements due to the mirror-up state.

The control unit 21 performs photometric measurements by periodically obtaining a signal for photometric measurements from the image sensor 10 during live-view image capture. For example, it is sufficient to obtain one frame of live-view images as an image signal for photometric measurements. The control unit 21 reads the image signal from the image sensor 10, applies A/D conversion to the image signal, and stores the resultant image signal into the RAM. The control unit 21 divides a pixel region of the obtained pixel signal into, for example, 9×7 blocks as shown in FIG. 3, and calculates, for each block, luminance information using a pixel signal included in the block. Luminance information of each block is calculated by, for example, averaging luminances of all pixels in the block. It should be noted that luminance is calculated through, for example, conversion into a Bv value (luminance of the subject under the correct exposure) expressed in accordance with the additive system of photographic exposure (APEX). Pieces of projection data Y1 to Y7 and X1 to X9 are calculated based on such luminance information. In general, a method of converting data of a two-dimensional array, such as m rows×n columns, into data of a one-dimensional array obtained through addition or averaging in a row direction or a column direction is called projection from two dimensions to one dimension. Also, data of a one-dimensional array obtained as a result of addition in the column direction or the row direction is called a projection image or projection data. In the present embodiment, pieces of projection data Y1 to Y7 and X1 to X9 are calculated as follows.

$X1 = \Sigma(x1) \div 7$, where $x=1$ to 7

$X2 = \Sigma(x2) \div 7$, where $x=1$ to 7

$X3 = \Sigma(x3) \div 7$, where $x=1$ to 7

$X4 = \Sigma(x4) \div 7$, where $x=1$ to 7

$X5 = \Sigma(x5) \div 7$, where $x=1$ to 7

$X6 = \Sigma(x6) \div 7$, where $x=1$ to 7

$X7 = \Sigma(x7) \div 7$, where $x=1$ to 7

$X8 = \Sigma(x8) \div 7$, where $x=1$ to 7

$X9 = \Sigma(x9) \div 7$, where $x=1$ to 7

$Y1 = \Sigma(1y) \div 9$, where $y=1$ to 9

$Y2 = \Sigma(2y) \div 9$, where $y=1$ to 9

$Y3 = \Sigma(3y) \div 9$, where $y=1$ to 9

$Y4 = \Sigma(4y) \div 9$, where $y=1$ to 9

$Y5 = \Sigma(5y) \div 9$, where $y=1$ to 9

$Y6 = \Sigma(6y) \div 9$, where $y=1$ to 9

$Y7 = \Sigma(7y) \div 9$, where $y=1$ to 9 \hfill (Math 1)

The control unit 21 obtains the maximum value $E_{max}$ among the calculated pieces of projection data Y1 to Y7 and X1 to X9, and calculates an exposure compensation value γ based on the obtained maximum value $E_{max}$. Specifically, when the value $E_{max}$ exceeds a Bv value of 10, the exposure compensation value γ is calculated using the following expression.

$$\gamma = (E_{max} - 10) \times 0.25$$

Here, exposure compensation is performed using the exposure compensation value γ based on the experimental rule that it is often preferable for a high-luminance subject having a Bv value greater than 10 to be bright in a captured image. The coefficient 0.25 is merely an example, and it is sufficient to determine an optimal value thereof depending on the desired brightness of a high-luminance subject in a captured image. The average Bv of the entire image signal (AVEBv) is calculated using the following expression.

$$\text{AVE}Bv = \Sigma(Xx + Yy) \div (7 \times 9) \hfill \text{(Math 2)}$$

where x=1 to 7, y=1 to 9

Accordingly, a control value corresponding to a Bv value is obtained in accordance with the following Math 3.

$$\text{Correct exposure: AVEBv} + \gamma \hfill \text{(Math 3)}$$

Figure 4:
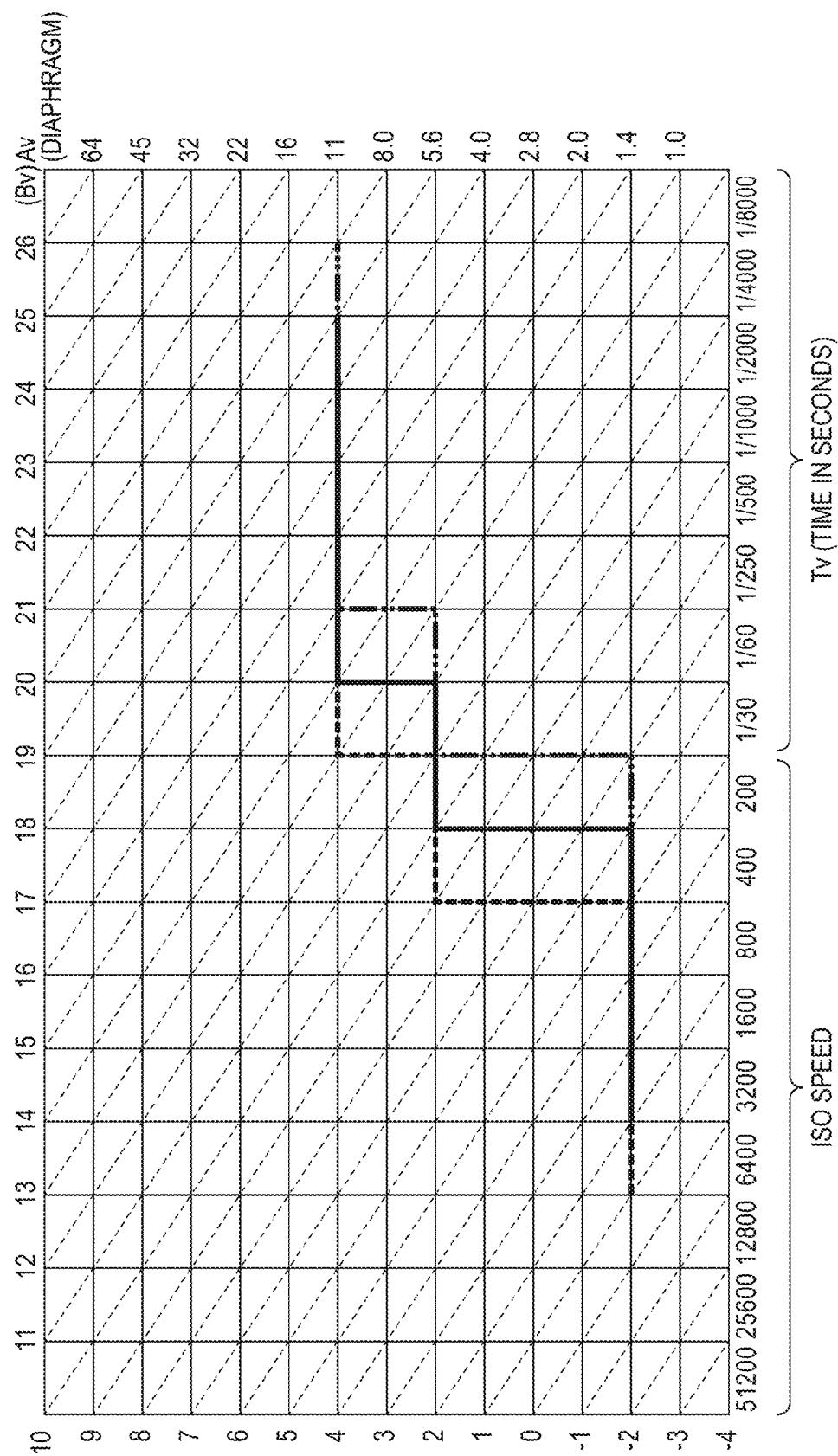
FIG. 4 is a program diagram used to determine exposure conditions in HDR video capture processing according to the first embodiment.

The control unit 21 determines exposure conditions with reference to a program diagram that has been preset based on this control value corresponding to a Bv value. FIG. 4 shows an example of a program diagram used in the present HDR video capture. A solid line, a dash line, and a two-dot chain line indicate the correct exposure, overexposure, and underexposure, respectively. A vertical axis on the right represents an f-number Av, and a vertical axis on the left and a horizontal axis on the top represent a Bv value. While a horizontal axis on the bottom represents Tv (shutter speed), a shutter speed of 1/30 seconds or higher is expressed by an ISO speed in the diagram of FIG. 4. This is because, in video capture, there is a limit on a Tv value depending on a frame rate. For example, in FIG. 4, when the correct exposure is 30 FPS, the maximum setting of overexposure is 1/30 seconds, and hence higher exposures are realized by increasing the ISO speed. Based on the above-described control value corresponding to a Bv value, the control unit 21 determines exposure conditions (ISO speed, diaphragm, and time in seconds) with reference to a data table corresponding to the program diagram, and performs exposure control under the exposure conditions. Subsequently, exposure conditions for overexposure and underexposure are determined; here, it is sufficient to refer to the program diagram after altering a control value corresponding to a Bv value as follows.

Overexposure: AVEBv+γ+α, where α is an exposure difference from the correct exposure (Math 4)

Underexposure: AVEBv+γ−β, where β is an exposure difference from the correct exposure. (Math 5)

The control unit 21 controls overexposure and underexposure so as to realize the exposure conditions determined using Math 4 and Math 5. In step S16, the control unit 21 executes focus detection processing and drives the lens to the obtained focus position. The control unit 21 causes the image sensor 10 to accumulate signals for focus detection. It should be noted that focus detection using the AF sensor 9 is not performed because image capture is consecutively performed in the mirror-up state in order to record video. Therefore, focus detection is performed using image signals obtained by the image sensor 10 in accordance with a contrast detection method. Upon completion of the accumulation, A/D conversion is applied while reading the accumulated signals, and the resultant signals are stored into the RAM 35 as image signals for focus detection. Furthermore, a focus detection region in which focus is to be achieved is determined by calculating the focus states of various portions of an image capture screen from lens information obtained in step S11 and the image signals for focus detection. It should be noted that the position of a focus detection region may be determined using other methods; for example, a focus detection region that is predesignated by the user through the operation unit 23 may be used, and a focus detection region may be set on a human face using an image recognition technique such as facial detection. The control unit 21 calculates a lens movement amount for focusing on the determined focus detection region in accordance with the focus states in the determined focus detection region and the lens information, and controls the focus lens driving unit 52 through the lens control unit 51. This makes the changeable lens 2 focus on the subject in the focus detection region. As information of the distance encoder changes with driving of the focus lens, the control unit 21 also updates various types of lens information in the changeable lens 2.

In the processing of steps S17 to S27 described below, overexposed image capture and underexposed image capture are repeated in an alternating manner, and HDR composite images are sequentially generated using two temporally neighboring frames. A description is now given of the merit of generating an HDR composite image using two temporally consecutive frames with reference to FIGS. 5 to 7. In the following description, an image signal obtained through overexposed image capture is referred to as an overexposed image, whereas an image signal obtained through underexposed image capture is referred to as an underexposed image.

Figure 5:
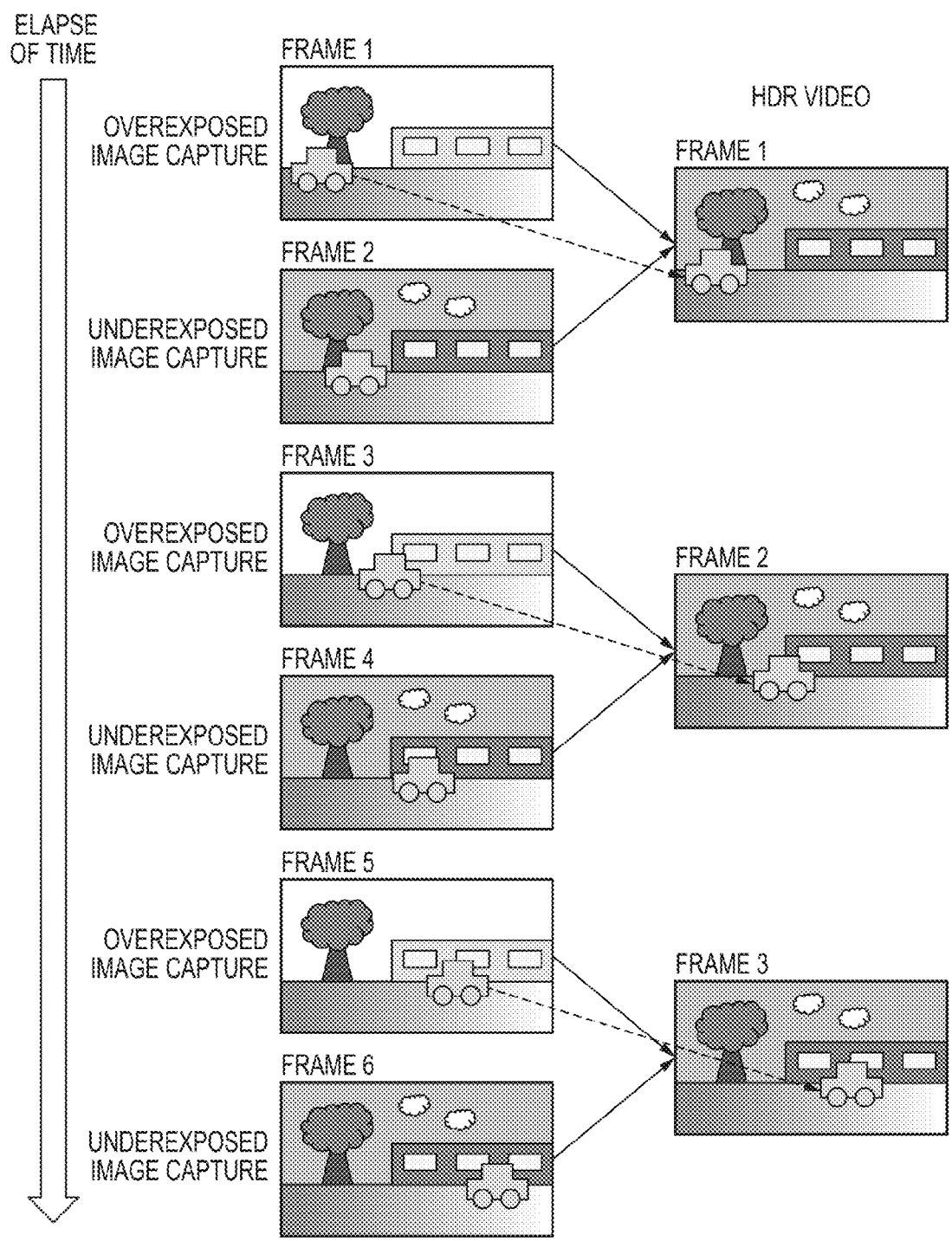
FIG. 5 is a diagram for describing HDR video with which an image capture frame rate is reduced by half.

In general, as shown in FIG. 5, one HDR composite image is generated using a pair of captured frames as follows.

(Math 6)

$$\begin{cases} HDR1: \\ \text{Overexposed image capture } 1 + \text{Underexposed image capture } 1 \\ HDR2: \\ \text{Overexposed image capture } 2 + \text{Underexposed image capture } 2 \\ HDR3: \\ \text{Overexposed image capture } 3 + \text{Underexposed image capture } 3 \\ \vdots \\ HDR(2i): \\ \text{Overexposed image capture } (i) + \text{Underexposed image capture } (i) \\ HDR(2(i+1)): \\ \text{Overexposed image capture } (i+1) + \text{Underexposed image capture } (i+1) \end{cases}$$

With this method, images captured as a pair are used only in generation of one HDR composite image, and therefore a frame rate of HDR composite images is half of a frame rate used in image capture.

Figure 6:
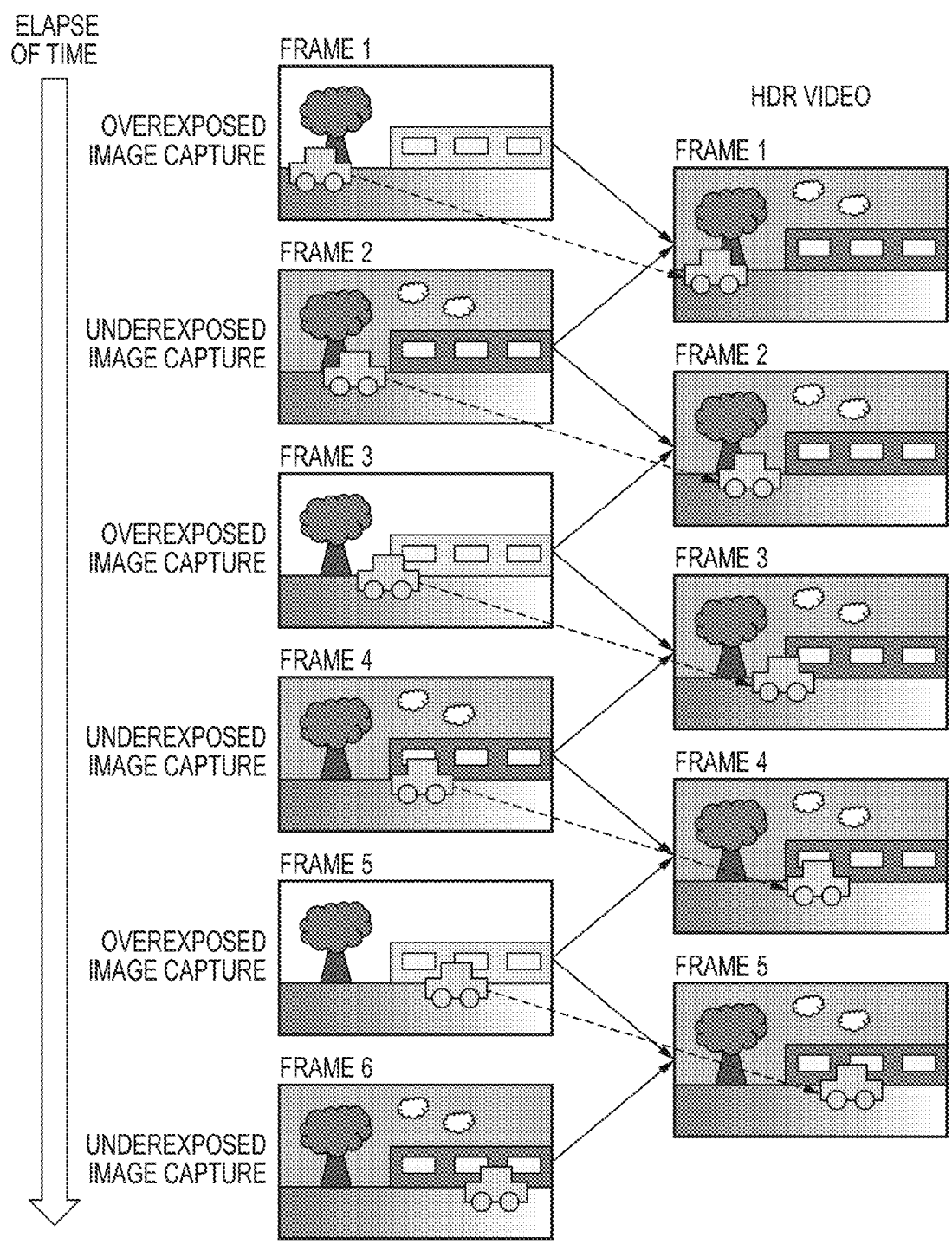
FIG. 6 is a diagram for describing HDR video with which an image capture frame rate is maintained.

On the other hand, as shown in FIG. 6, one of frames used in HDR composition can be reused as follows. In the present embodiment, as shown in FIG. 6, HDR video composition is performed using a method in which one of frames is reused.

(Math 7)

$$\begin{cases} HDR1: \\ \text{Overexposed image capture } 1 + \text{Underexposed image capture } 1 \\ HDR2: \\ \text{Underexposed image capture } 1 + \text{Overexposed image capture } 2 \\ HDR3: \\ \text{Overexposed image capture } 2 + \text{Underexposed image capture } 2 \\ \vdots \\ HDR(i): \\ \text{Overexposed image capture } (i-1) + \text{Underexposed image capture } (i) \\ HDR(i+1): \\ \text{Underexposed image capture } (i) + \text{Overexposed image capture } (i+1) \end{cases}$$

This method provides the merit of preventing a frame rate after HDR composition from decreasing compared to a frame rate during image capture. Meanwhile, if the result of image processing including development processing is reused in addition on top of the reuse of frames, it is expected that deterioration in the image quality associated with colors and luminances (e.g., a tone jump) will occur in, for example, a scene where colors and luminances change with time.

Figure 7:
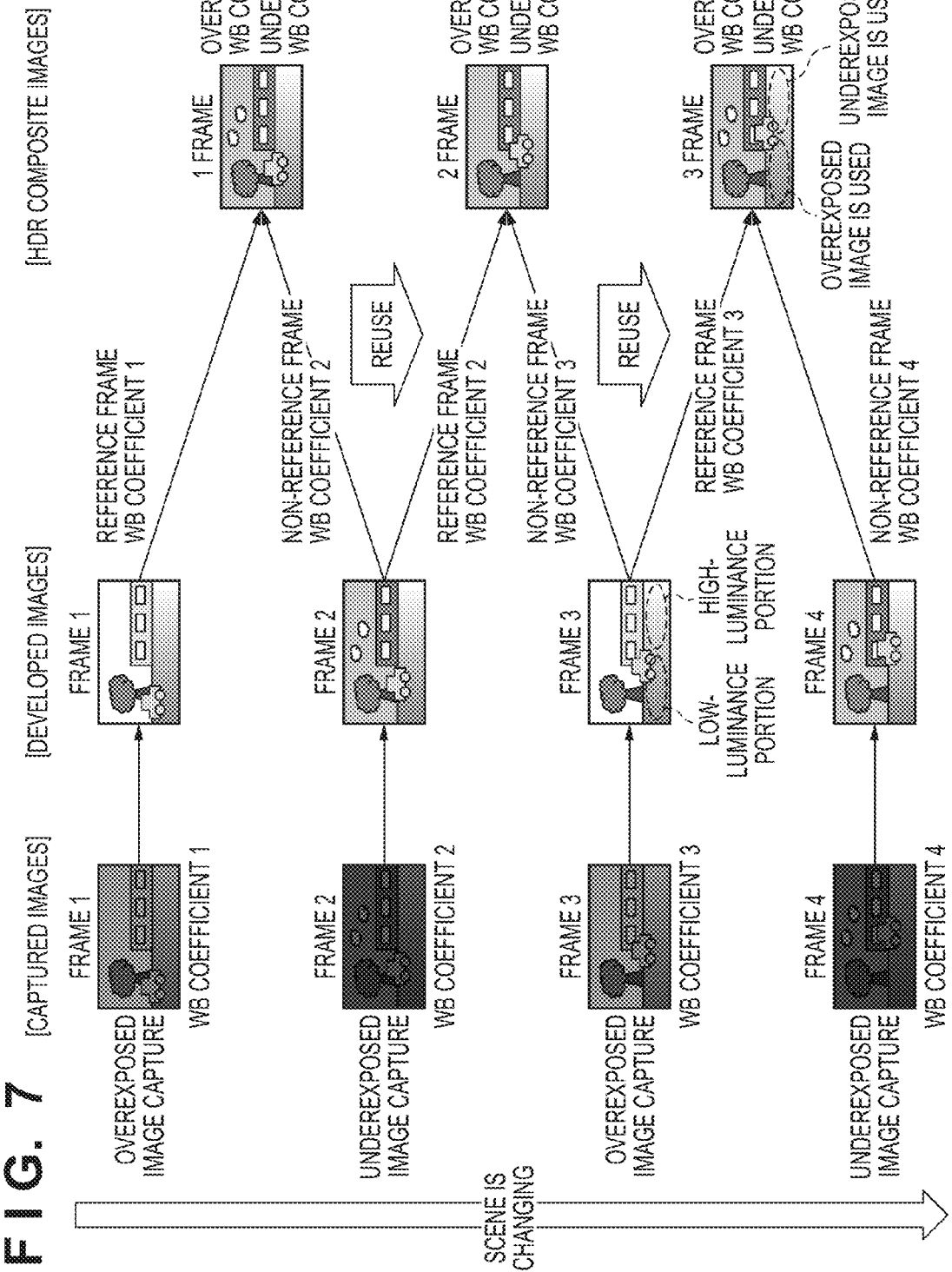
FIG. 7 is a diagram for describing reuse of a development result as a frame used in the next HDR composition.

The details of this issue will now be described with reference to FIG. 7. In FIG. 7, time elapses from top to bottom, and overexposed image capture and underexposed image capture are repeated. In an example of FIG. 7, frames 1 to 4 show a scene that changes with time, and a white balance coefficient (WB coefficient) changes from WB coefficient 1 to WB coefficient 4 with such a change in the scene, that is to say, there are four different patterns of white balance coefficient. White balance processing is applied to an overexposed image obtained through overexposed image capture for frame 1 using WB coefficient 1, and the result of development thereof is frame 1 of developed images. Similarly, white balance processing is applied to an underexposed image corresponding to frame 2 using WB coefficient 2, and the result of development thereof is frame 2 of developed images. WB coefficient 3 and WB coefficient 4 are used in a similar manner. Next, frame 1 of HDR composite images is generated using frame 1 and frame 2 of the developed images. Similarly, frame 2 of HDR composite images is generated on the basis of frame 2 and frame 3 of developed images. Frame 3 of HDR composite images is generated in a similar procedure.

As a result of HDR composition processing, which will be described later, HDR composite images include both overexposed images and underexposed images to which white balance processing has been applied using different WB coefficients. For example, assume that a lower left side and a lower right side of a screen showing frame 3 of developed images are a low-luminance portion and a high-luminance portion, respectively. In HDR composition processing, an overexposed image is actively used for a low-luminance portion, whereas an underexposed image is actively used for a high-luminance portion. Therefore, the lower left portion and the lower right portion of the screen show different shades of color, and it is hence expected that a tone jump will occur at the border between a portion for which an overexposed image has been used and a portion for which an underexposed image has been used. It is assumed that, in FIG. 7, a reference frame denotes a frame of the earliest time among two frames used in HDR composition, and a non-reference frame denotes the other of the two frames; this concept applies throughout the following description.

Referring back to FIG. 2, a description is now given of processing from step S17. It should be noted that, in step S14, the control unit 21 executes the following initialization processing. Specifically, a frame number i is initialized to frame 1, and a counter k for periodically updating a target value of white balance, which will be described later, is initialized to 0. At this timing, which one of images used in HDR composition serves as a reference frame is also determined.

In step S17, the control unit 21 determines whether a frame to be processed is the first frame, that is to say, frame 1. The control unit 21 proceeds to step S18 so as to capture the reference frame if the frame number i is equal to 1, and proceeds to step S19 otherwise.

In step S18, the image sensor 10 captures the reference frame in accordance with an instruction from the control unit 21. The image sensor 10 stores the captured image into the RAM 35.

In step S19, the control unit 21 determines whether the frame to be processed is the head of an α-frame cycle. The control unit 21 proceeds to step S20 if the frame to be processed is the head of the α-frame cycle, and proceeds to step S22 if the frame to be processed is not the head of the α-frame cycle.

In step S20, the control unit 21 calculates a white balance coefficient (WB coefficient) that serves as a parameter for white balance processing. In the present embodiment, for the purpose of reducing the processing load, the control unit 21 calculates a WB coefficient in, for example, every α frames, that is to say, one WB coefficient is comprehensively calculated for α frames ahead.

Figure 9:
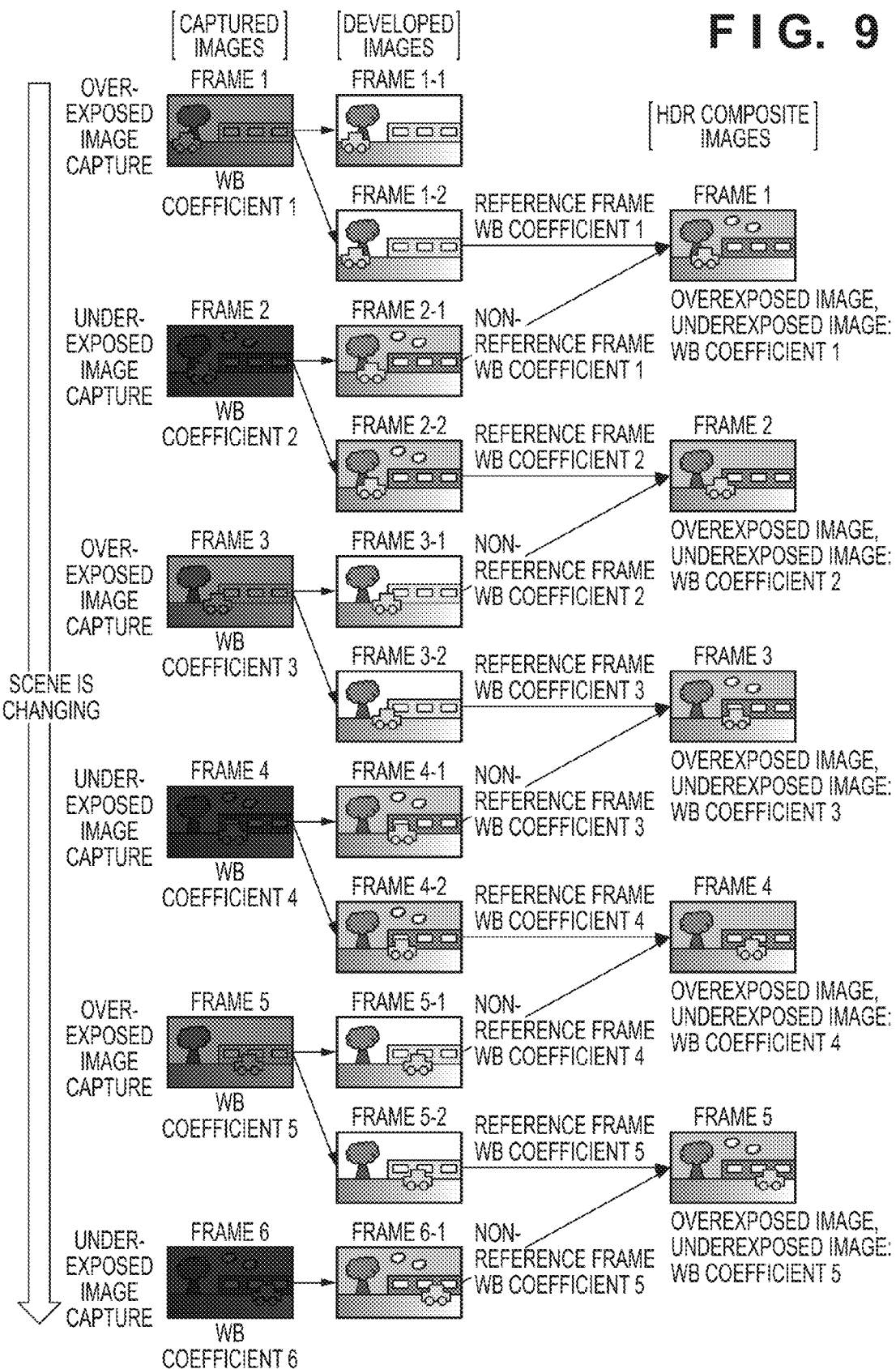
FIG. 9 is a diagram for describing HDR composition that follows development using a white balance coefficient with a changing pattern according to the first embodiment.

In the present embodiment, in order to reduce the occurrence of the aforementioned tone jump, one captured image is developed multiple times while changing a development parameter as shown in FIG. 9, instead of reusing one developed image in the second HDR composition as shown in FIG. 6.

An outline of development processing according to the present embodiment will now be described. It is assumed that frame 1 corresponds to the timing for calculating a WB coefficient, that is to say, it is the first frame in the α-frame cycle shown in the flowchart of FIG. 2. The following is a target white balance coefficient for α frames ahead, which is calculated using a later-described white balance coefficient calculation method.

$$WB_{R\alpha} = \frac{G_\alpha}{R_\alpha}, \quad WB_{B\alpha} = \frac{G_\alpha}{B_\alpha} \quad \text{(Math 8)}$$

Assume that a white balance coefficient for the current frame is as follows.

$$WB_{R1} = \frac{G_1}{R_1}, \quad WB_{B1} = \frac{G_1}{B_1} \quad \text{(Math 9)}$$

In this case, if the white balance coefficient is linearly changed over α frames, a white balance coefficient for an arbitrary frame i is as follows.

$$WB_{Ri} = \left(\frac{G_\alpha}{R_\alpha} - \frac{G_1}{R_1}\right) \times \frac{i}{\alpha - 1} + \frac{G_1}{R_1}, \quad \text{(Math 10)}$$

$$WB_{Bi} = \left(\frac{G_\alpha}{B_\alpha} - \frac{G_1}{B_1}\right) \times \frac{i}{\alpha - 1} + \frac{G_1}{B_1}$$

Using the foregoing method, the control unit 21 calculates six patterns of WB coefficient (WB coefficient 1 to WB coefficient 6) for frame 1 to frame 6 shown in FIG. 9. As shown in FIG. 9, the calculated WB coefficients are applied to corresponding captured images, and then HDR composite images are generated. In order to apply the same white balance coefficient to an overexposed image and an underexposed image used for an HDR composite image, one captured image is developed twice while changing a WB coefficient. A white balance coefficient for a reference frame is always used as the basis of white balance to be changed. For example, frame 1-2 of developed images, which is used for frame 1 of HDR composite images, is developed using WB coefficient 1, and frame 2-1 of developed images, which is a non-reference frame, is developed using WB coefficient 1 for the reference frame. Frame 2 of captured images, which is used for developed image 2-1, is reused for frame 2 of HDR composite images, and developed image 2-2, which is a reference frame, is developed using WB coefficient 2.

Once the control unit 21 has calculated the WB coefficients, it stores the calculated WB coefficients into the memory 28, proceeds to step S22 of FIG. 2, and increments the counter k by one.

Figure 8:
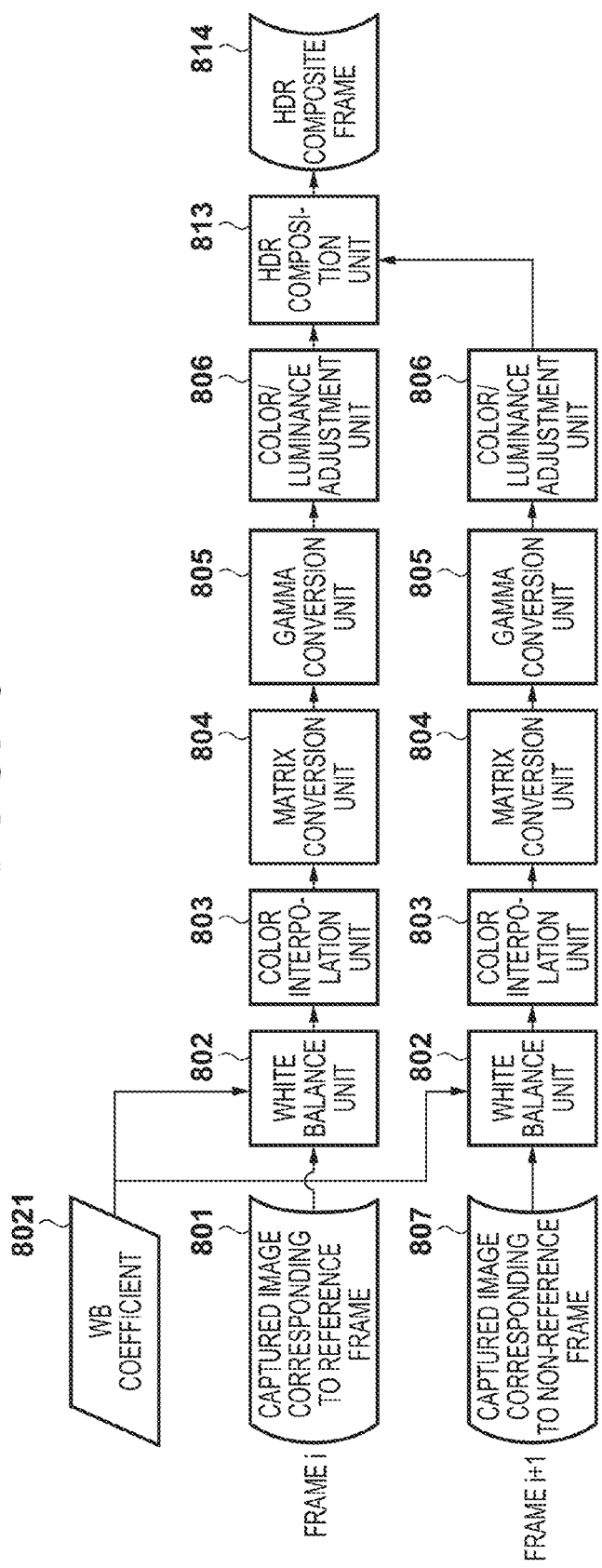
FIG. 8 is a block diagram showing an example functional configuration for development processing and composition processing according to the first embodiment.

A description is now given of generation of a development parameter and development processing executed in steps S22 and S23 with reference to FIG. 8. Processing of function blocks is applied to each one of captured images including overexposed frames and underexposed frames.

A subject image is formed on the image sensor 10 by an image forming optical system (lens), and photoelectric conversion is applied to the formed subject image. The image sensor 10 is, for example, a single-chip color image sensor provided with an ordinary primary-color filter. The primary-color filter is composed of color filters of three types that have transmissive dominant wavelength bands near 650 nm, 550 nm, and 450 nm, respectively, and captures color planes corresponding to R (red), G (green), and B (blue) bands. In a single-chip color image sensor, these color filters are spatially arrayed in one-to-one association with pixels, and each pixel can only obtain the intensity of light on the corresponding, single color plane. Accordingly, the image sensor outputs a color mosaic image (801 and 807). A white balance unit 802 executes whitening processing for white. Specifically, RGB data of pixels constituting a captured image is plotted in a predetermined color space such as an x-y color space, and G, R, and B of data plotted near a black-body radiation locus, which has a high possibility of representing the color of the light source in that color space, are integrated. Then, WB coefficients G/R and G/B for R and B components are calculated from the obtained integrated value. It should be noted that the WB coefficients are not limited to being calculated using the foregoing method, and may be calculated using any known method, a further complicated method, etc.

In step S22, the signal processing unit 25 generates a development parameter for the reference frame i in accordance with an instruction from the control unit 21, and reads a white balance coefficient 8021 stored in the memory 28.

In step S23, the signal processing unit 25 applies development processing to the reference frame. A color interpolation unit 803 applies interpolation to the color mosaic image, thereby generating a color image in which every pixel has complete RGB color information. The generated color image is converted into a basic color image through a matrix conversion unit 804 and a gamma conversion unit 805.

Prior to high-dynamic-range composition, it is necessary to equalize the luminance levels of an overexposed frame and an underexposed frame that have been captured under different exposures. As it is necessary to prevent blown-out highlights and blocked-up shadows, a gain applied by the gamma conversion unit 805 is not uniform, but complies with gamma curves. For example, these gamma curves are designed such that the property represented by the gamma curves is realized by applying a gain corresponding to an exposure difference of 2 EV, that is to say, applying a double gain in the case of underexposure and a ½ gain in the case of overexposure. In this way, a smooth border can be realized when switching among a plurality of images in accordance with a luminance range. A color/luminance adjustment unit 806 applies, to the color image, processing for improving the appearance thereof, e.g., image correction for enhancing saturation through backlight correction and detection of an evening view, in accordance with the scene. When the processing by the color/luminance adjustment unit 806 ends, the development processing is complete. When the development processing for the reference frame i is ended, the control unit 21 proceeds to step S24 so as to subsequently apply processing to a non-reference frame i+1.

Similarly to the foregoing processing for the reference frame, the control unit 21 captures the non-reference frame i+1 (underexposed frame) in step S24, generates a development parameter in step S25, and executes development processing in step S26.

In step S27, the signal processing unit 25 causes an HDR composition unit 813 to execute HDR composition processing in accordance with an instruction from the control unit 21. In the case of HDR composition of still images, spatial alignment is typically performed prior to the composition, on the basis of one of the images, as a measure against a movement that appears in the images due to a hand movement and the like. On the other hand, in the case of HDR video composition, an image capture interval between an overexposed frame and an underexposed frame is much shorter than that of still image capture, and alignment processing is typically not executed, for example, because images rendered after alignment give the impression that a frame rate thereof has been reduced, and because of the amount of calculation in the processing. Upon completion of processing for overexposure development, the signal processing unit 25 proceeds to step S28.

Figure 10:
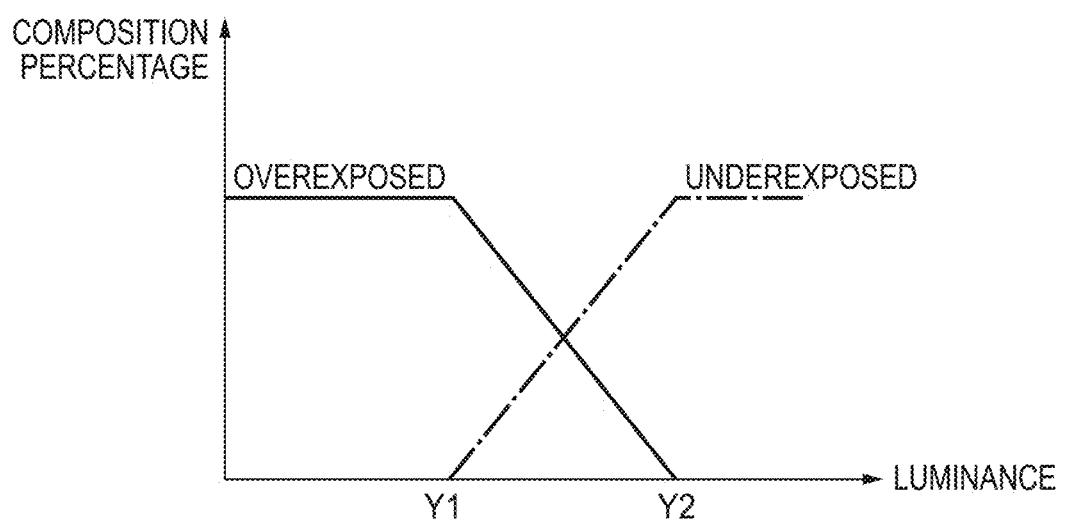
FIG. 10 shows examples of composition percentages of two images in HDR composition processing.

A description is now given of HDR composition processing with reference to FIG. 10. A horizontal axis represents a reference luminance, and a vertical axis represents a composition ratio at which images are composited through addition. Only an overexposed developed image is used for a region that is darker than a threshold Y1 for the reference luminance at the time of composition, whereas only an underexposed developed image is used for a region that is brighter than a threshold Y2 for the reference luminance. In an intermediate region between the vicinities of the borders represented by the thresholds Y1 and Y2 for the reference luminance, changeover between images can be smoothed by gradually changing the composition ratio. It is assumed that an underexposed frame is used as the basis of the reference luminance in the present embodiment. Through the foregoing processing, the signal processing unit generates HDR images and stores the generated HDR images into the memory 28.

In step S28, the control unit 21 determines whether an instruction for ending the image capture has been issued through pressing of a REC button and the like via the operation unit 23. If it determines that the instruction for ending the image capture has not been issued, it returns to step S14 and repeats processing of steps S15 to S27. On the other hand, if it determines that the instruction for ending the image capture has been issued, it proceeds to step S29 so as to compress the generated HDR video.

The signal processing unit 25 compresses the HDR video stored in the memory in a predetermined format in accordance with an instruction from the control unit 21 in step S29, records the compressed HDR video into the storage unit 26, which may be a memory, in step S30, and then ends the sequence of operations.

Although the above-described present embodiment has given an example in which HDR composition processing is executed using two developed images, i.e., an overexposed frame and an underexposed frame, the present embodiment is applicable also to a case in which obtainment of three or more frames is repeated. For example, in the case of HDR composition of three frames, it is sufficient to generate three developed images from each frame, and perform HDR composition of three frames to which the same WB coefficient has been applied.

The above-described present embodiment adopts the following configuration: image capture of two frames under different exposures is repeated, development processing is applied to one captured image multiple times while changing a WB coefficient, and a developed image that has once been used in HDR composition for a previous frame is not used again. Furthermore, the same WB coefficient is applied to developed images used in HDR composition. In this way, deterioration in the image quality of a generated image can be reduced, even in a scene where colors and luminances change during HDR video capture. That is to say, by compositing developed images to which the same WB coefficient has been applied, the occurrence of a tone jump can be suppressed and deterioration in the image quality can be reduced, even in a scene where colors and luminances change. Furthermore, in the present embodiment, one captured image is used in both HDR composition processing for a frame to be processed and HDR composition processing for the next frame. In this way, the number of generated HDR composite images corresponds to a frame rate at which captured images are obtained, and HDR video capture can be performed without reducing a frame rate.

(Second Embodiment)

A second embodiment will now be described. In the first embodiment, two developed images are generated from one captured image using two white balance coefficients (WB coefficients) having two different values, and HDR composition is performed using two developed images to which the same white balance coefficient has been applied. In contrast, in the present embodiment, two developed images are generated from one captured image while changing a lookup table for adjusting colors or luminances. It is sufficient for the digital camera 100 according to the present embodiment to have the same configuration as that according to the first embodiment. Therefore, the same constituents are given the same reference numerals, and redundant explanations are omitted, that is to say, the following description focuses on the differences.

Figure 11:
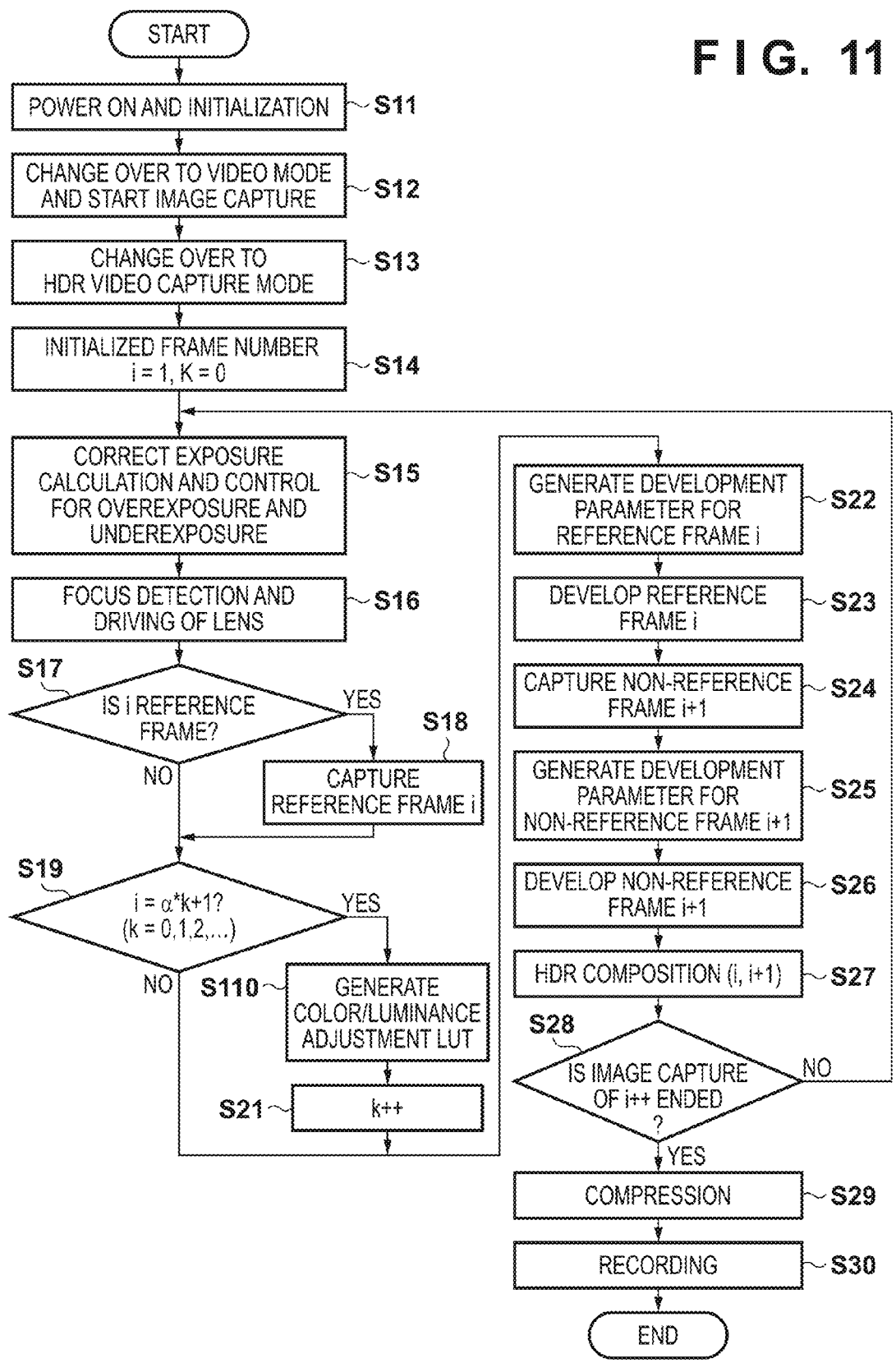
FIG. 11 is a flowchart showing a sequence of operations of HDR video capture processing according to a second embodiment.

A description is now given of a specific method of adjusting colors or luminances with reference to FIGS. 11 to 13. A color/luminance adjustment unit 1202 shown in FIG. 12A is composed of function blocks shown in FIG. 12B. As will be described later in detail, the color/luminance adjustment unit 1202 is composed of a histogram detection unit 9062, a correction amount calculation unit 9063, an LUT reading unit 9064, and a tone correction unit 9065.

First, processing for generating a color/luminance adjustment LUT in step S110 of FIG. 11 will be described in detail. It should be noted that the present processing is executed if the control unit 21 determines in step S19 that a frame to be processed corresponds to updating of the color/luminance adjustment LUT.

The histogram detection unit 9062 of the color/luminance adjustment unit 1202 detects a luminance histogram of an output image from the gamma conversion unit 805. Although it is desirable to detect a luminance histogram from all pixels in the image, a luminance histogram may be detected after scaling down the image through thinning processing, low-pass filter processing, and the like for the purpose of saving a processing time period and a memory capacity. It should be noted, in general, edge portions of an image are often unimportant, and are influenced by a decrease in the amount of surrounding light depending on an image capture lens; for this reason, a histogram may be generated from pixels other than pixels in a peripheral portion. Thereafter, the histogram detection unit 9062 detects a histogram feature amount. The histogram feature amount may be, for example, a level (SD) of pixels having a cumulative frequency of 10% in the histogram from a dark side.

The correction amount calculation unit 9063 calculates correction amounts corresponding to input luminances based on the histogram feature amount output from the histogram detection unit 9062. The correction amount calculation unit 9063 obtains, for each of representative luminance values of the histogram, target luminances corresponding to some input luminance values, and calculates target output luminances corresponding to input luminances from minimum and maximum values of the target luminances and image luminances through spline interpolation and the like. The difference between an input luminance and a target output luminance is the target correction amount, and a tone curve formed by the target output luminances corresponding to various luminances indicates the tone correction property. The tone correction property can be represented by a lookup table (LUT) showing correspondence between the input luminances and the output luminances.

Figure 13A:
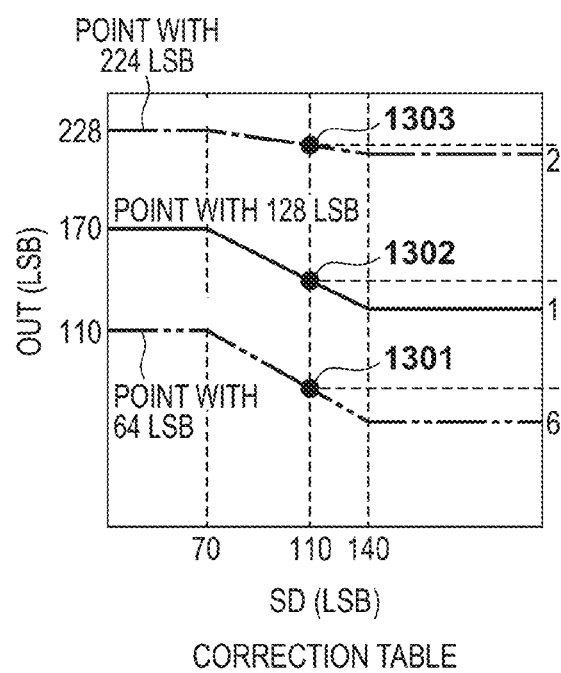
FIGS. 13A and 13B show a method of generating a lookup table used in tone correction according to the second embodiment.

A further description of an example operation of the correction amount calculation unit 9063 will now be given with reference to FIGS. 13A and 12B. FIG. 13A shows an example of a relationship between representative luminance values of a histogram and target luminances corresponding to three input luminance values (64 LSB, 128 LSB, 224 LSB). It should be noted that LSB indicates resolution, and it is assumed in the present embodiment that a full scale (the minimum value to the maximum value) of luminance values is represented by 8-bit resolution (0 LSB to 255 LSB). In FIG. 13A, a sideways line corresponding to "point of 64 LSB" indicates a relationship between a target output luminance of a pixel having an input luminance of 64 LSB and the representative luminance values of the histogram. For example, if a representative luminance value of a histogram detected from a captured image is in a range of 255 LSB to 140 LSB, the target output luminance of a pixel having a luminance of 64 LSB in the captured image is 64 LSB (that is to say, there is no change). In the case of an image in which a representative luminance value of a histogram is in a range of 70 LSB to 0 LSB, the target output luminance of a pixel having a luminance of 64 LSB is 110 LSB. If a representative luminance value of a histogram is in a range from 140 to 70, the target output luminance of a pixel having a luminance of 64 LSB changes linearly between 64 LSB and 110 LSB.

Figure 13B:
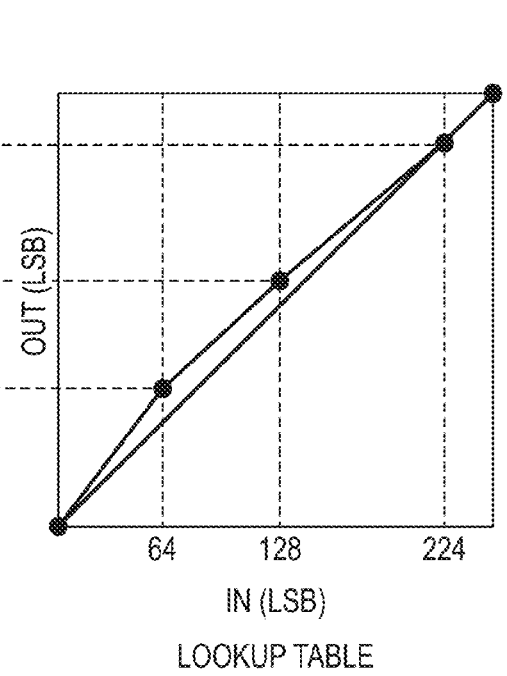

If a representative luminance value of a histogram is 110 LSB, the target output luminances of pixels having luminances of 64 LSB, 128 LSB, and 224 LSB are 82 LSB, 135 LSB, and 226 LSB, respectively (reference numerals 1301 to 1303 are assigned thereto, respectively), as shown in FIG. 13A. Therefore, in the case of an image in which a face has a representative luminance value of 110 LSB, the tone correction property shown in FIG. 13B is obtained by applying spline interpolation to three points indicating the input/output relationships at the foregoing three points and to points corresponding to the minimum luminance value (0 LSB) and the maximum luminance value (255 LSB). In this way, analysis on an image histogram enables correction of, for example, SD-level pixels (a somewhat underexposed scene).

Although the histogram detection unit 9062 and the correction amount calculation unit 9063 are included in the color/luminance adjustment unit 1202 in the above description, they may be provided outside the color/luminance adjustment unit 1202, for example, they may be included in the control unit 21. Furthermore, although the above description of the present embodiment has been given using a histogram of an input image by way of example, a representative luminance of a face may be calculated using, for example, facial detection instead of a histogram, and a correction table for brightening a dark face based on the representative luminance may be generated.

Referring back to FIG. 11, if the control unit 21 determines in step S19 that the frame to be processed does not correspond to updating of the color/luminance adjustment LUT, it proceeds to step S22.

The LUT reading unit 9064 obtains LUT information stored in the memory 28 in step S22, and the tone correction unit 9065 applies tone correction to the output image from the gamma conversion unit 805 in step S23.

More specifically, similarly to the first embodiment, development processing is applied to a captured image twice while changing a development parameter. In the present embodiment, changing the development parameter means changing the color/luminance adjustment LUT. A description is now given of an outline of processing for applying development processing twice using the color/luminance adjustment LUT with reference to FIG. 14.

Figure 14:
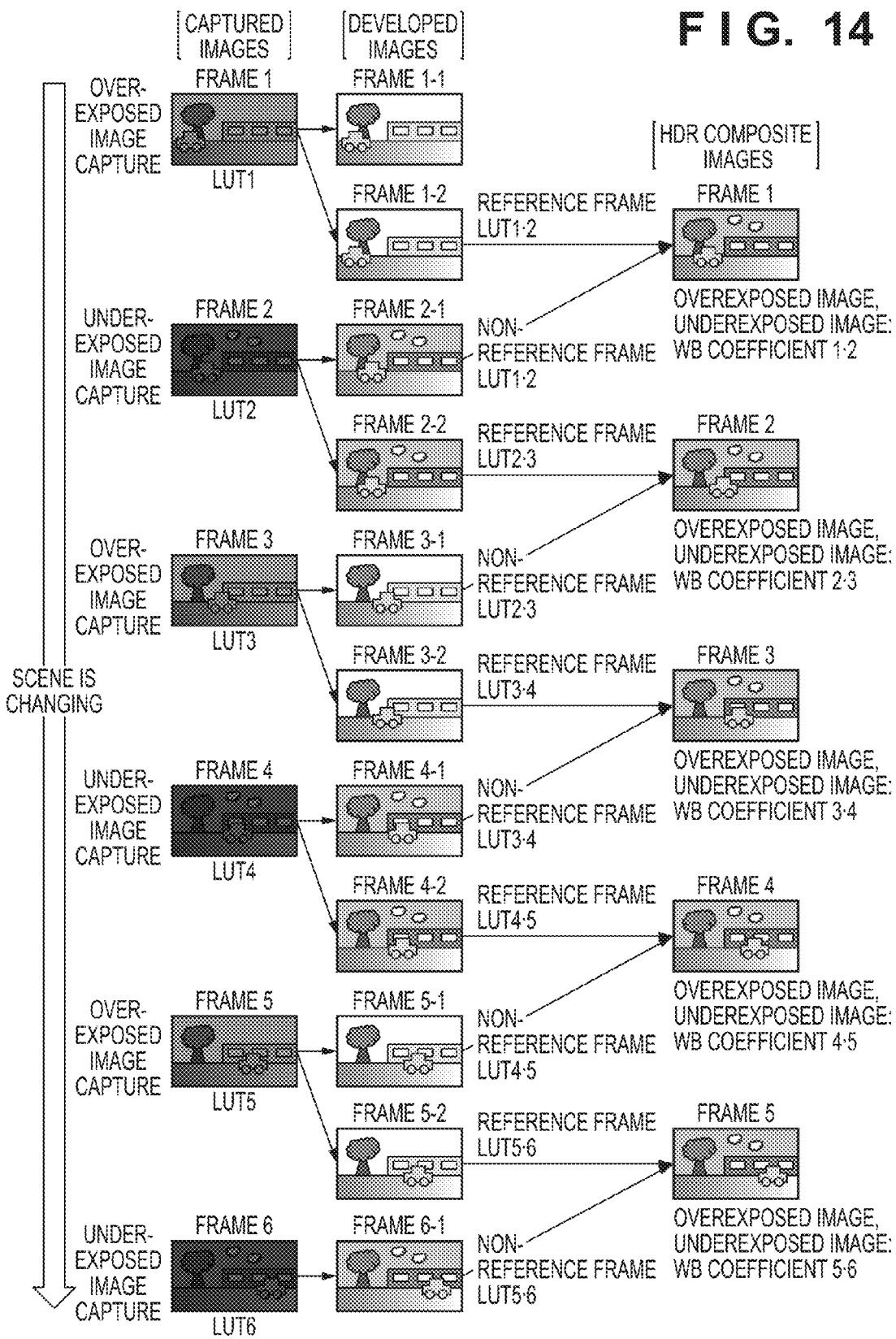
FIG. 14 shows HDR composition that follows development using a lookup table for color/luminance adjustment according to the second embodiment.

It is assumed that frame 1 shown in FIG. 14 corresponds to the timing for calculating the color/luminance adjustment LUT, that is to say, it is the first frame in the α-frame cycle shown in FIG. 2. It is also assumed that a target color/luminance adjustment LUT for α frames ahead, which is calculated using a color/luminance adjustment LUT calculation method, is LUTα. Similarly to the first embodiment, color/luminance adjustment LUTs for various frames are obtained as LUT 1 to LUT 6 in such a manner that a color/luminance adjustment LUT changes linearly over α frames, and each LUT is applied in generation of the corresponding developed images.

In the first embodiment, one WB coefficient that has been obtained in advance is applied in development processing for a single captured image. However, development processing may be executed using a combination of a plurality of development parameters that have been obtained in advance. For example, the description of the present embodiment gives an example in which color/luminance adjustment LUTs for a reference frame and a non-reference frame are combined. Specifically, in order to generate LUT 1+2 representing a combination of LUT 1 and LUT 2 that neighbor each other, it is sufficient to perform weighted addition of the LUTs as shown below.

$$\begin{cases} LUT_1(0, a_1) & LUT_{1\cdot 2}(0, \beta \cdot a_1 + (1-\beta) \cdot b_1) & LUT_2(0, b_1) \\ LUT_1(0, a_2) & LUT_{1\cdot 2}(0, \beta \cdot a_2 + (1-\beta) \cdot b_2) & LUT_2(0, b_2) \\ LUT_1(0, a_3) & LUT_{1\cdot 2}(0, \beta \cdot a_3 + (1-\beta) \cdot b_3) & LUT_2(0, b_3) \\ \vdots & & \\ LUT_1(0, a_{255}) & LUT_{1\cdot 2}(0, \beta \cdot a_{255} + (1-\beta) \cdot b_{255}) & LUT_2(0, b_{255}) \end{cases}$$ (Math 11)

Here, a and b denote LUT elements, and 8-bit table accuracy is expected. Averaging may be performed by simply substituting β, which indicates a weighted addition percentage of each LUT, with 0.5. In a case where an exposure difference between overexposure and underexposure is expressed in seconds, β may be set such that the weight for an overexposed image under longer-second exposure increases depending on the exposure difference expressed in seconds. With the method of generating HDR composite images shown in FIG. 14, a development image is generated using an LUT obtained by combining LUTs for an overexposed frame and an underexposed frame of captured images. For example, frame 2 of HDR composite images is generated by compositing a reference frame and a non-reference frame to each of which a development parameter obtained by combining LUT 2 corresponding to an underexposed image and LUT 3 corresponding to an overexposed image has been applied.

The above-described present embodiment adopts the following configuration: image capture of two frames under different exposures is repeated, development processing is applied to one captured image twice while changing a color/luminance adjustment LUT, and a developed image that has once been used in HDR composition for a previous frame is not used again. Also, the same color/luminance adjustment LUT is applied in generation of developed images used in HDR composition (that is to say, developed images corresponding to an overexposed image and an underexposed image). To this end, an LUT obtained by combining the color/luminance adjustment LUTs for an overexposed frame and an underexposed frame is used such that the same development parameter is used for overexposed image capture and underexposed image capture. In this way, deterioration in the image quality of a generated image can be reduced, even in a scene where colors and luminances change during HDR video capture. That is to say, by compositing developed images to which the same LUT has been applied, the occurrence of a tone jump can be suppressed and deterioration in the image quality can be reduced, even in a scene where colors and luminances change.

(Third Embodiment)

A third embodiment will now be described. In the present embodiment, noise reduction (NR) processing that does not change with time is executed, and parameters are set for a method of rendering a moving object and for noise reduction processing corresponding thereto. It is sufficient for the digital camera 100 according to the present embodiment to have the same configuration as that according to the first embodiment. Therefore, the same constituents are given the same reference numerals, and redundant explanations are omitted, that is to say, the following description focuses on the differences.

Figure 15:
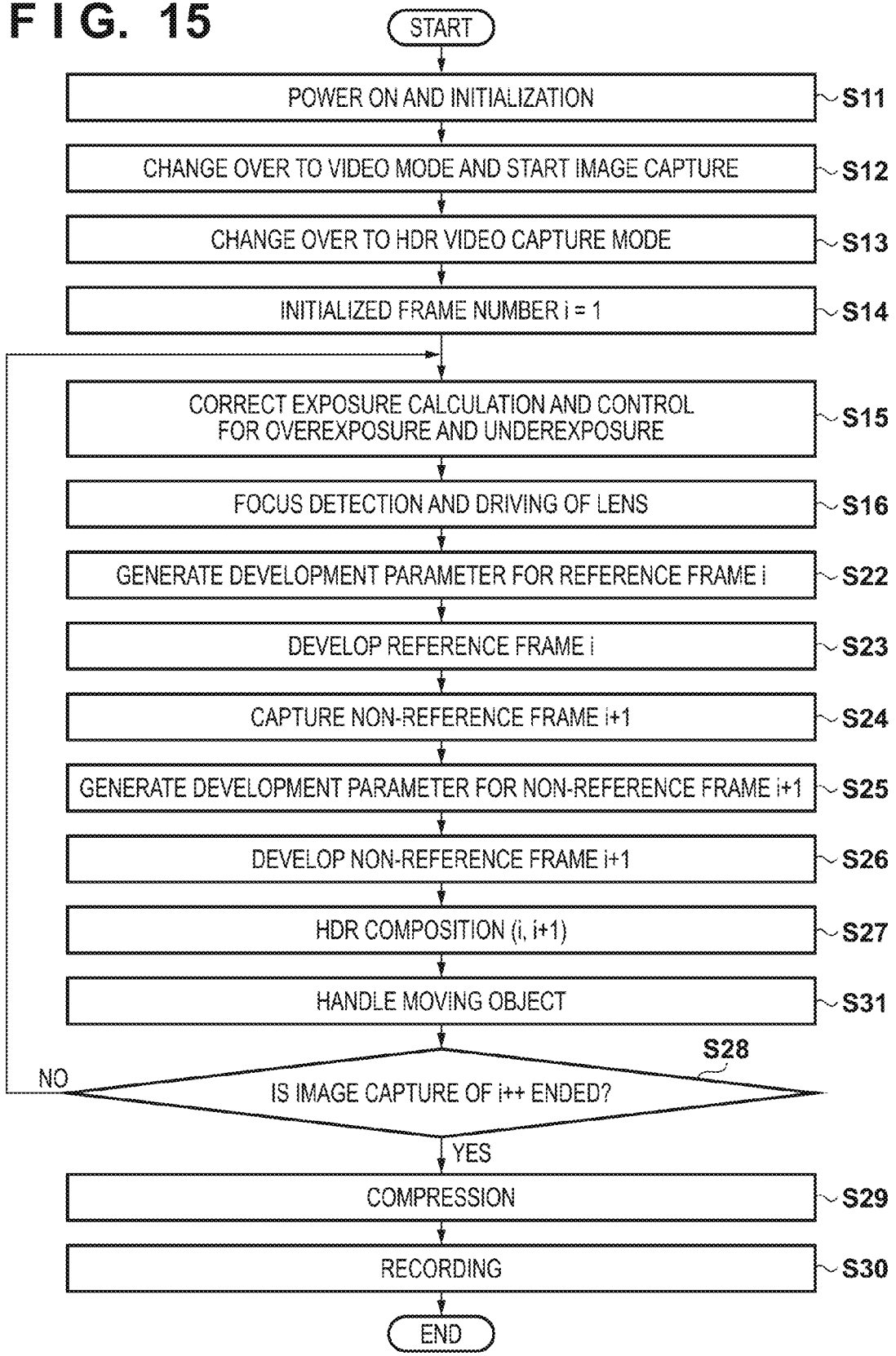
FIG. 15 is a flowchart showing a sequence of operations of HDR video capture processing according to a third embodiment.

A description is now given of a sequence of operations for HDR video capture according to the present embodiment with reference to FIG. 15. As stated earlier, noise reduction processing is executed without using a parameter that changes with time as in the first and second embodiment; therefore, processing of steps S17 to S21 shown in FIG. 2 is not executed. On the other hand, moving object handling processing, which will be described later, is executed in step S31 after the HDR composition processing of step S27.

First, an outline of the moving object handling processing will be described. There are several possible methods of rendering a moving object in HDR composition for compositing a plurality of images. For example, in one method, a moving object portion in a reference frame is displayed at 100% in every frame. However, considering the properties of HDR video capture, an overexposed image is expected to include many saturated portions. In a case where a moving object portion is saturated, there is a concern that a blinking phenomenon, such as flickering, occurs as a result of alternating appearances of an overexposed image having a saturated portion and an underexposed image having no saturated portion. In another method, an underexposed image is always displayed at 100% whether it is a reference frame or a non-reference frame. However, as a moving object portion in a composite image is generated using only an underexposed image, a frame rate of the moving object portion is reduced by half.

In view of this, in the present embodiment, a moving object portion in an HDR composite image is multiple-rendered, that is to say, the rendered moving object portion is a combination of a reference frame and a part of a non-reference frame. This makes it possible to reduce the blinking phenomenon even if a moving object portion is saturated.

Figure 16:
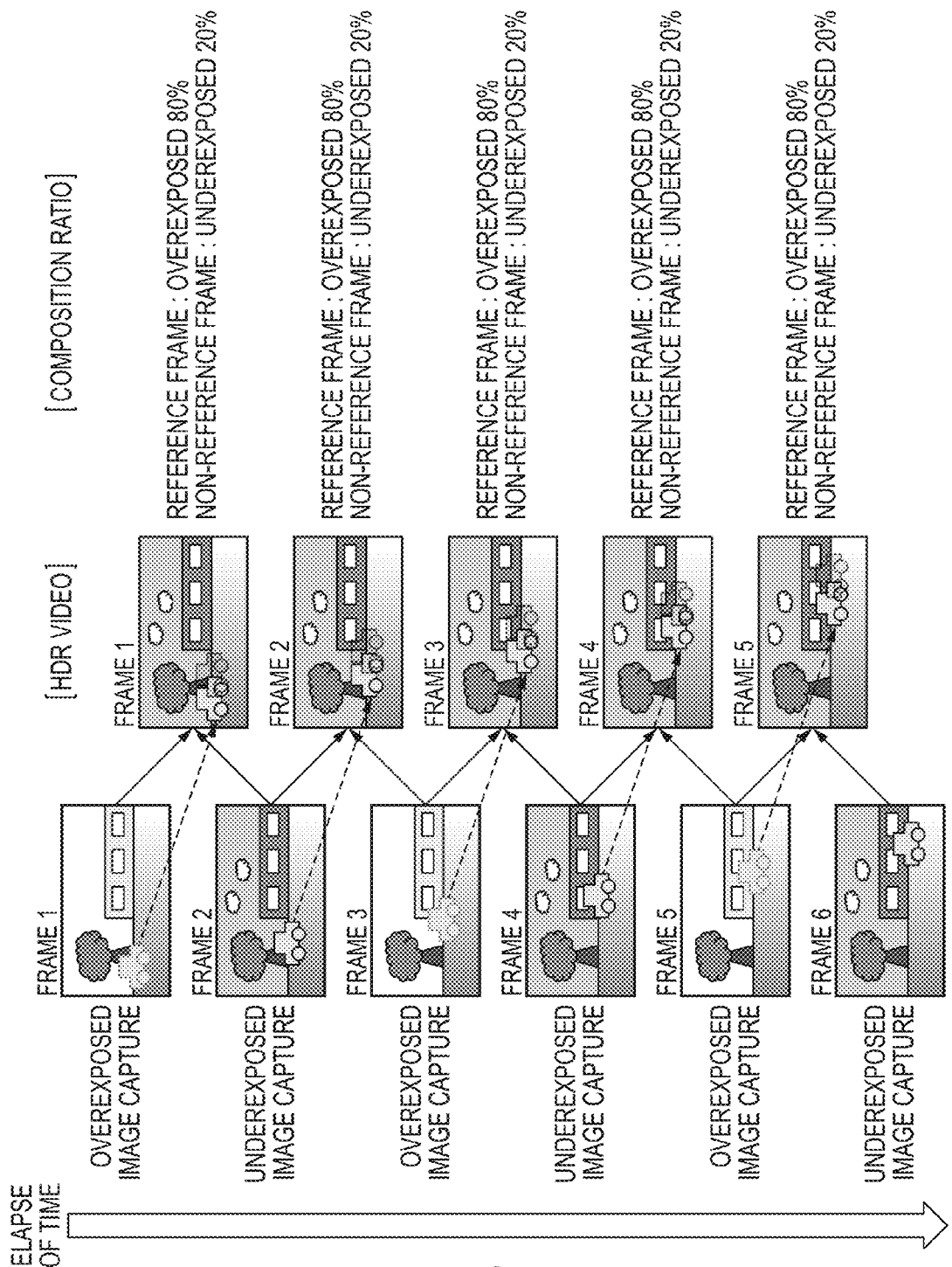
FIG. 16 shows an example of HDR composition through multiple rendering of a moving object according to the third embodiment.
Figure 17:
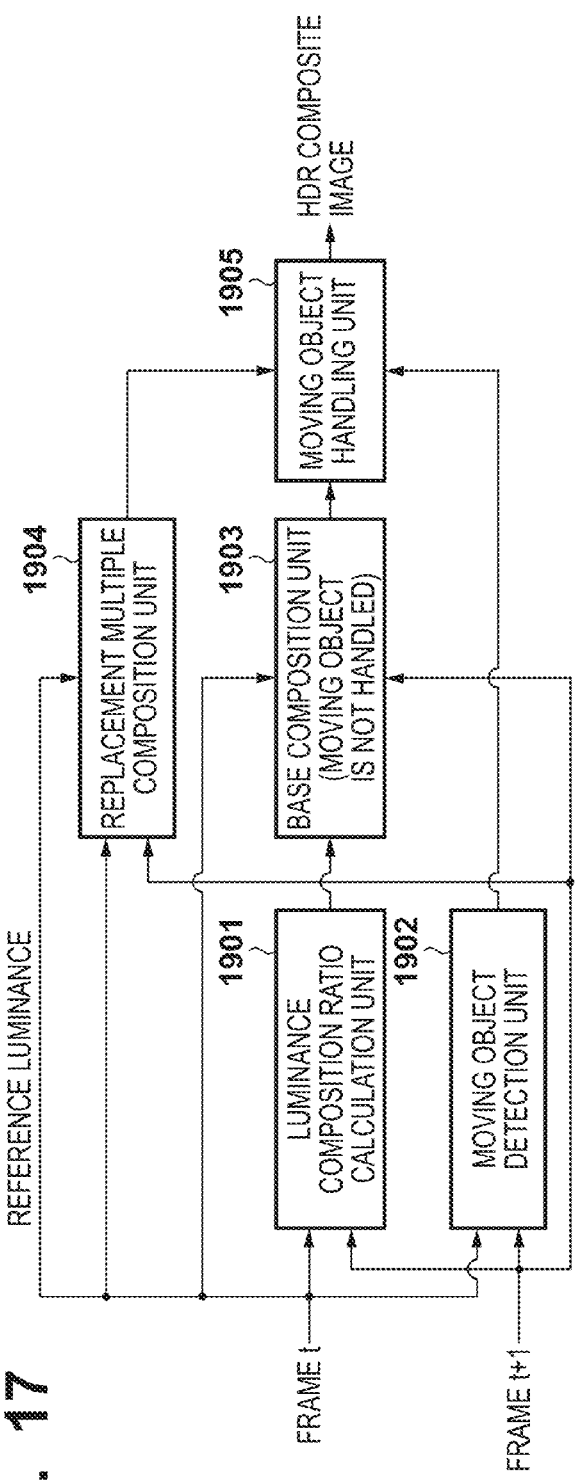
FIG. 17 is a block diagram showing an example functional configuration for moving object handling processing according to the third embodiment.

A description is now given of rendering of a moving object, that is to say, moving object handling processing, with reference to FIGS. 15 to 17. Referring to FIG. 17, a luminance composition ratio calculation unit 1901 and a base composition unit 1903 execute processing of step S27 shown in FIG. 15, and a moving object handling unit 1905 executes processing of step S31 shown therein. Two input images used in HDR composition are frame t and frame t+1 of developed images.

First, the luminance composition ratio calculation unit 1901 calculates the composition percentages shown in FIG. 10 based on a reference luminance of frame t of the developed images, and the base composition unit 1903 generates a base composite image in accordance with the calculated composition percentages. This base composite image is an image input to the moving object handling unit 1905. As frame t alternates between an overexposed frame and an underexposed frame with time, the reference luminance to be referred to also alternates. In this way, the frame rate for the reference luminance can be maintained.

Next, a moving object detection unit 1902 extracts a moving object portion. There are several methods of extracting a moving object portion; for example, in the present embodiment, an absolute value of the difference between an image corresponding to frame t and an image corresponding to frame t+1 is used. That is to say, a region with no difference can be identified as a portion with no movement, whereas a region with a difference can be identified as a portion with a movement, that is to say, a moving object portion.

Figure 18A:
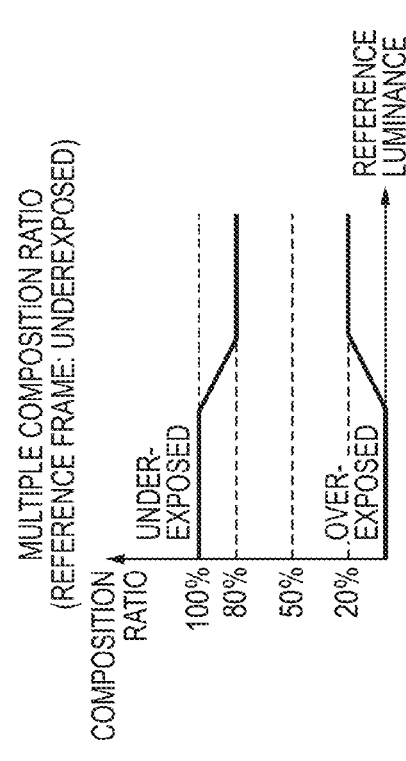
FIGS. 18A and 18B show a relationship between a composition ratio and a reference luminance according to the third embodiment.
Figure 18B:
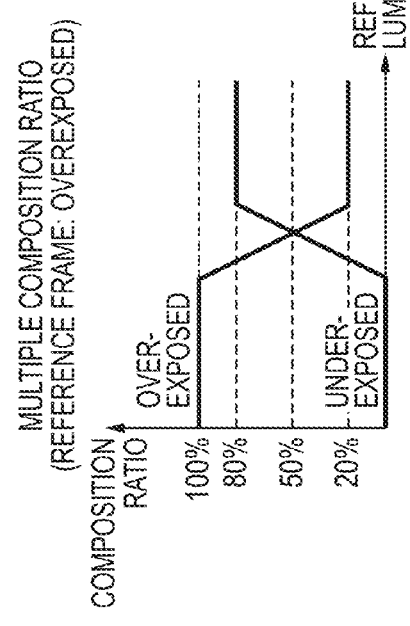

A replacement multiple composition unit 1904 performs multiple composition of the image corresponding to frame t and the image corresponding to frame t+1. It is assumed that the composition ratio (multiple composition percentages) used in multiple composition of the present processing is a preset, fixed ratio that is independent of the reference luminance, for example, 80% for a reference frame and 20% for a non-reference frame. FIG. 16, which will be described later, shows composition of a reference frame and a non-reference frame at a fixed ratio. It should be noted that, as shown in FIGS. 18A and 18B, the multiple composition percentages may fluctuate adaptively in accordance with the reference luminance. In this way, in medium- and low-luminance regions that are not easily saturated even if they include a moving object, the reference frame is displayed at 100%, whereas in a high-luminance region that is easily saturated, multiple composition percentages can be set so as to make an underexposed image dominant.

Finally, the moving object handling unit 1905 executes processing for replacing the moving object portion in the base composite image output from the base composition unit 1903 with a replacement multiple image output from the replacement multiple composition unit 1904.

If the moving object portion is multiple-rendered using the foregoing method, there is a case in which a moving object portion is based on a reference frame in which an underexposed image is dominant at 80%, and there is also a case in which a moving object portion is based on a non-reference frame in which an underexposed image is non-dominant at 20%, as shown in FIG. 16 for example. As described earlier, processing for equalizing exposures after development is executed by applying gain reduction processing to an overexposed frame, or by applying gain increase processing to an underexposed frame, through gamma conversion. As a gain increase using a digital gain amplifies noise components as well, an underexposed frame is expected to include more noise. Consequently, a blinking phenomenon is expected to occur due to the alternating uses of a frame including a small amount of noise and a frame including a large amount of noise.

Figure 20:
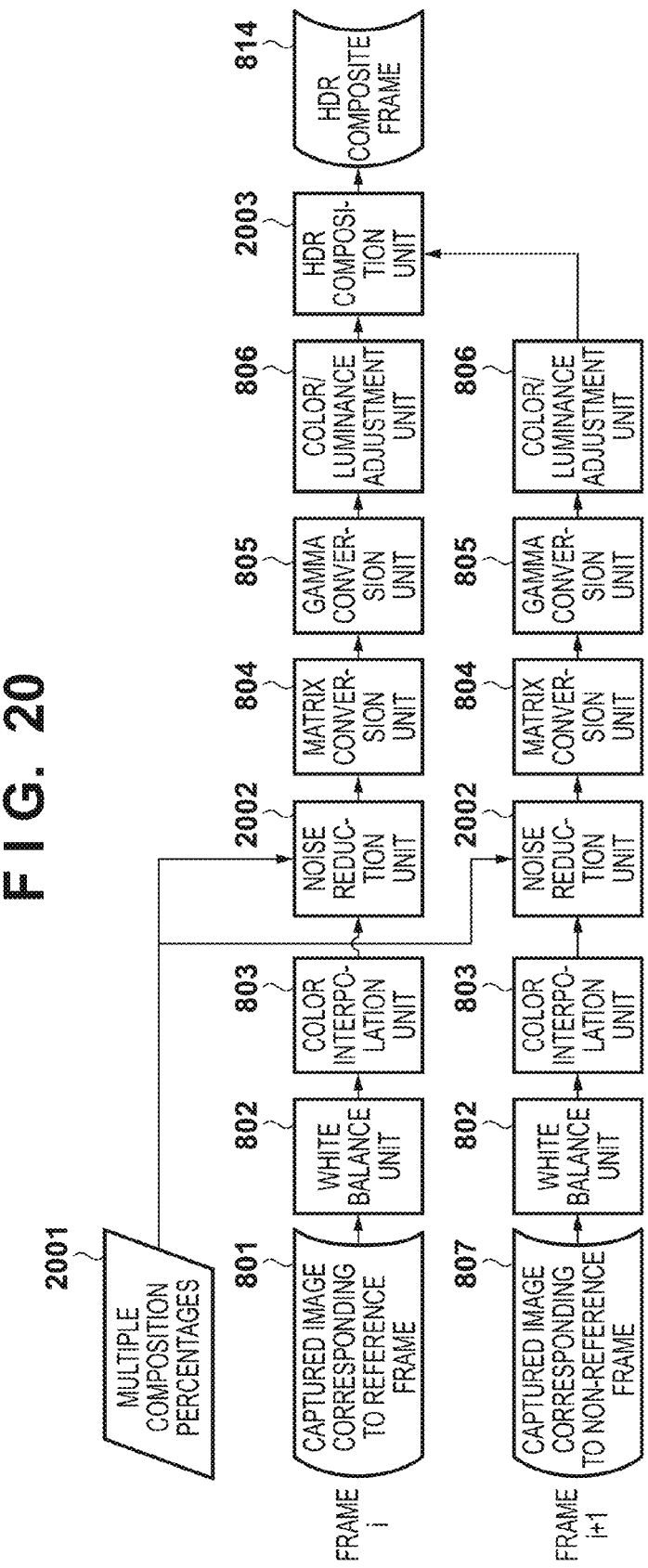
FIG. 20 is a block diagram showing an example functional configuration for development processing and composition processing according to the third embodiment.

In view of this, in the present embodiment, processing for enhancing the intensity of noise reduction processing is further executed when a multiple composition percentage of an underexposed frame is high. The details of the noise reduction processing will be described later, and a description is now given of function blocks for development processing and HDR composition processing according to the present embodiment with reference to FIGS. 20 and 21. The function blocks for development processing and HDR composition processing according to the present embodiment additionally include a noise reduction unit 2002 subsequent to the color interpolation unit 803, and an HDR composition unit 2003, which is the last of the function blocks, includes the moving object handling unit 1905.

Figure 21:
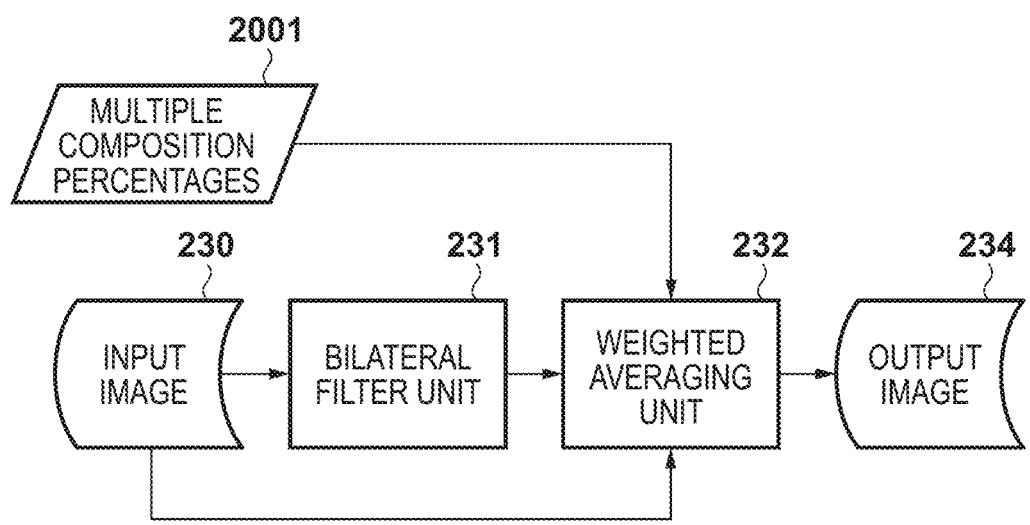
FIG. 21 is a block diagram showing an example functional configuration for noise reduction processing according to the third embodiment.

The details of the noise reduction unit 2002 will now be described with reference to FIG. 21. Blurring an image signal is an effective way to remove noise such as light-related shot noise and dark current noise. However, simply blurring an image signal makes the edge of the subject blurry as well, resulting in a dull image with reduced overall sharpness. In view of this, a bilateral filter, which is a nonlinear filter, is used as a means of reducing only noise components without destroying the texture of an image signal. A bilateral filter is effective in removing noise through smoothing while maintaining the intensity of an edge portion. It should be noted that a bilateral filter can be applied using a known technique, and therefore a detailed description thereof is omitted. A bilateral filter unit 231 applies a bilateral filter to an input image 230, and then a weighted averaging unit 232 performs weighted averaging of the input image 230 and an output image to which the bilateral filter has been applied in accordance with multiple composition percentages 2001 for a target frame, and outputs an output image 234. Noise can be controlled by thus combining the original image with an image in which noise has been reduced through the bilateral filter in accordance with predetermined percentages.

Figure 19:
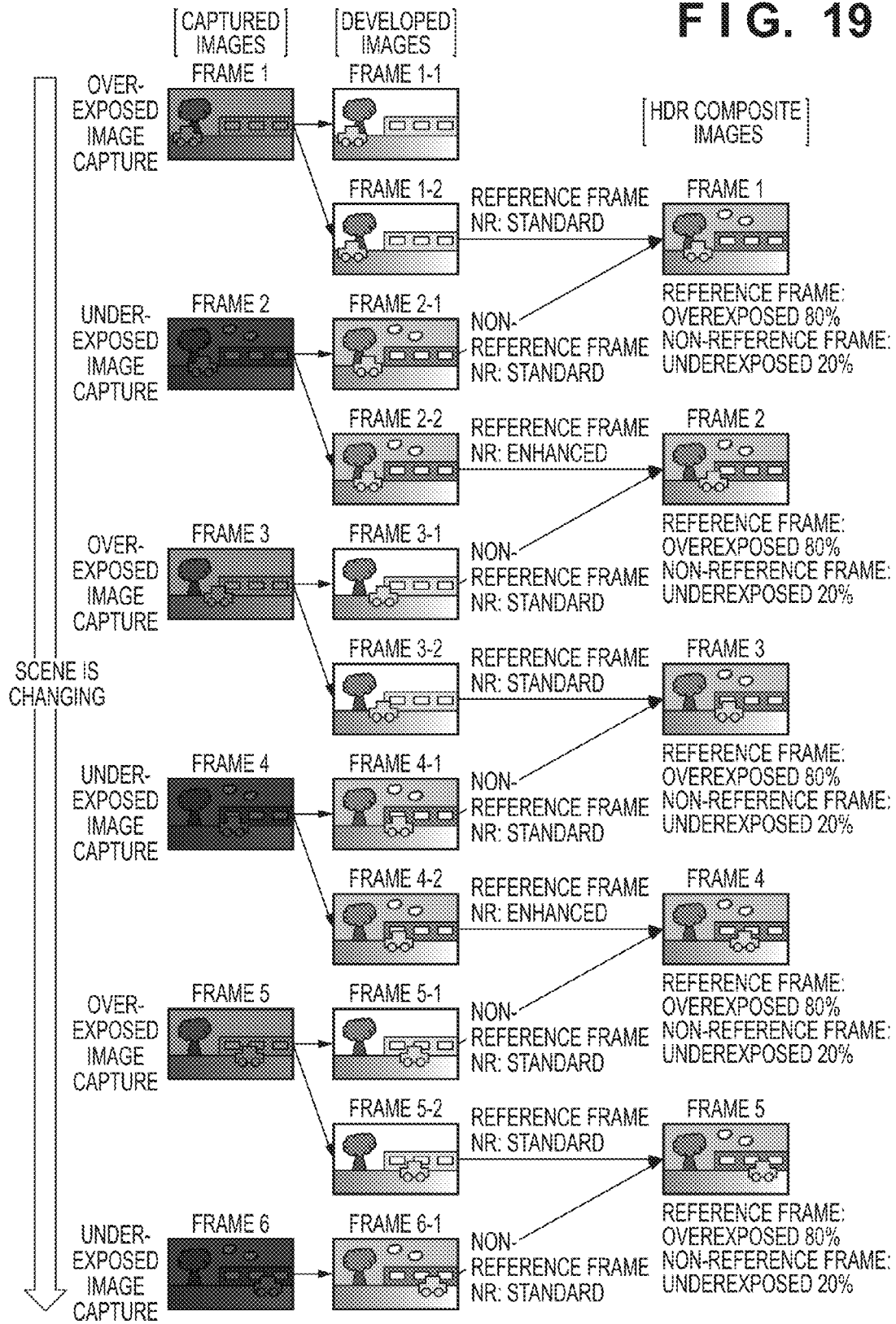
FIG. 19 shows an example of a change in the intensity of noise reduction processing in accordance with a composition ratio according to the third embodiment.
Figure 22:
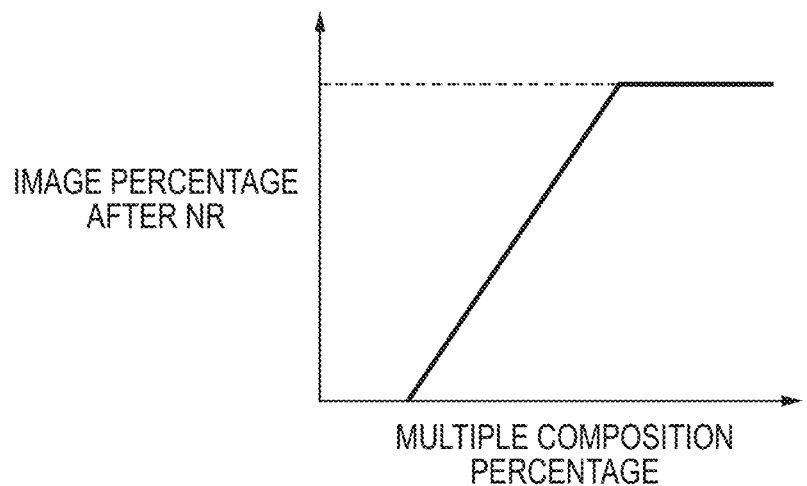
FIG. 22 shows a relationship between an image percentage after noise reduction processing and a composition ratio according to the third embodiment.

A description is now given of examples of HDR composite images that are generated using output images from the noise reduction unit 2002 with reference to FIG. 19. In a case where an underexposed image shown in FIG. 19 is used as a reference frame (frame 2 and frame 4 of HDR composite images), the underexposed image is dominant at a multiple composition percentage of 80%; therefore, the percentage of an output image from the bilateral filter is increased compared to that of the input image so as to increase the noise reduction effect. The relationship between a multiple composition percentage and the intensity of noise reduction is set such that the noise reduction effect increases as the multiple composition percentage increases as shown in FIG. 22. Although a bilateral filter is used in noise reduction processing in the present embodiment, any other means, such as a median filter and a sigma filter, may be used. Multiple composition percentages are not limited to the above-described examples, and may have any numerical values as long as a multiple composition percentage of a reference frame is higher than a multiple composition percentage of a non-reference frame.

It goes without saying that, in the present embodiment, the noise reduction processing according to the present embodiment may be further applied to images to which the development parameters described in the first and second embodiments have been applied. For example, in generation of frame 2 of HDR composite images shown in FIG. 19, WB coefficient 2 may be applied to each of the corresponding reference and non-reference frames. In this way, moving object handling processing can be executed while reducing deterioration in the image quality, even in a scene where colors and luminances change.

The above-described present embodiment adopts the following configuration: image capture of two frames under different exposures is repeated, development processing is applied to one captured image twice while changing a development parameter, and a developed image that has once been used in HDR composition for a previous frame is not used again. Furthermore, in accordance with multiple composition percentages of two developed images, the intensities of noise reduction processing at the time of development are adjusted. In this way, even in a scene where colors and luminances change in HDR video capture, deterioration in the image quality of generated images can be reduced, and in particular, noise between generated frames of HDR composite images can be reduced.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-157046, filed Jul. 31, 2014, which is hereby incorporated by reference herein in its entirety.

What is claimed is:

1. An image capturing apparatus comprising:
an image sensor;
a processor; and
a memory storing a computer program which, when executed by the processor, causes the processor to:
control the image sensor to repeat image capture of frame images under different exposures;
apply development processing to develop each of the captured frame images;
generate a composite image by compositing temporally consecutive developed captured frame images that have been developed, and
generate HDR video using sequentially generated composite images, wherein
the processor generates, from one captured frame image of the captured frame images, a first image and a second image that are associated with different development parameters, one development parameter in the different development parameters being calculated for the one captured frame image of the captured frame images and another development parameter in the different development parameters being calculated for another captured frame image of the captured frame images other than the one captured frame image of the captured frame images, and
the processor generates the composite image by compositing temporally consecutive developed captured frame images that have been developed using the same development parameter.

2. The apparatus according to claim 1, wherein
the processor applies the development processing to the captured frame images that are temporally consecutive using a development parameter whose pattern changes with time.

3. The apparatus according to claim 1, wherein
the different development parameters are white balance coefficients used in controlling white balance of the captured frame images.

4. The apparatus according to claim 1, wherein
the different development parameters are tone correction properties for correcting tones of colors or luminances of the captured frame images.

5. The apparatus according to claim 4, wherein
the processor uses, as the different development parameters, combined tone correction properties obtained by performing weighted addition of tone correction properties for the captured frame images that are temporally consecutive.

6. The apparatus according to claim 4, wherein
the tone correction properties are generated through interpolation based on a preset number of pieces of color or luminance information of the captured frame images.

7. The apparatus according to claim 6, wherein the processor further detects a region of a moving object in the temporally consecutive images that have been developed, and wherein
the processor generates an image of the detected region of the moving object by compositing, at a preset composition ratio, the temporally consecutive developed captured frame images.

8. The apparatus according to claim 1, wherein
in a case where the captured frame images are underexposed relative to correct exposure, the processor generates the first image in which noise has been smoothed and the second image in which noise has been smoothed more than the first image.

9. The apparatus according to claim 1, wherein
a frame rate of the HDR video is the same as a frame rate of an image captured by the image sensor.

10. A control method of an image capturing apparatus, the control method comprising:
performing image capture using an image sensor;
controlling the image sensor to repeat image capture of frame images under different exposures;
applying development processing to develop each of the captured frame images;

generating a composite image by compositing temporally consecutive developed captured frame images that have been developed, and generating HDR video using sequentially generated composite images, wherein the step of applying development processing generates, from one captured frame image of the captured frame images, a first image and a second image that are associated with different development parameters, one development parameter in the different development parameters being calculated for the one captured frame image of the captured frame images and another development parameter in the different development parameters being calculated for another captured frame image of the captured frame images other than the one captured frame image of the captured frame images, and the composite image is generated by compositing temporally consecutive developed captured frame images that have been developed using the same development parameter.

11. A non-transitory computer-readable storage medium storing a program for causing a computer to perform:

image capture using an image sensor;

controlling the image sensor to repeat image capture of frame images under different exposures;

applying development processing to develop each of the captured frame images;

generating a composite image by compositing temporally consecutive developed captured frame images that have been developed, and generating HDR video using sequentially generated composite images, wherein the step of applying development processing generates, from one captured frame image of the captured frame images, a first image and a second image that are associated with different development parameters, one development parameter in the different development parameters being calculated for the one captured frame image of the captured frame images and another development parameter in the different development parameters being calculated for another captured frame image of the captured frame images other than the one captured frame image of the captured frame images, and the composite image is generated by compositing temporally consecutive developed captured frame images that have been developed using the same development parameter.

\* \* \* \* \*